United States Patent [19]

Nada

[11] Patent Number: 5,070,693
[45] Date of Patent: Dec. 10, 1991

[54] AIR-FUEL RATIO FEEDBACK CONTROL SYSTEM HAVING SINGLE AIR-FUEL RATIO SENSOR DOWNSTREAM OF OR WITHIN THREE-WAY CATALYST CONVERTER

[75] Inventor: Mitsuhiro Nada, Susono, Japan

[73] Assignee: Toyota Jidosha Kabushiki Kaisha, Toyota, Japan

[21] Appl. No.: 616,200

[22] Filed: Nov. 20, 1990

[30] Foreign Application Priority Data

| Nov. 21, 1989 | [JP] | Japan | 1-300688 |
| Dec. 27, 1989 | [JP] | Japan | 1-336700 |
| Dec. 28, 1989 | [JP] | Japan | 1-338711 |

[51] Int. Cl.$^5$ ............................................... F01N 2/28
[52] U.S. Cl. ....................................... 60/274; 60/276
[58] Field of Search ............................... 60/274, 276

[56] References Cited

U.S. PATENT DOCUMENTS

| 4,173,952 | 11/1979 | Asano | 60/276 |
| 4,173,956 | 11/1979 | Ikeura | 60/276 |
| 4,840,027 | 6/1989 | Okumura . | |

FOREIGN PATENT DOCUMENTS

| 52-081438 | 6/1977 | Japan . |
| 56-023531 | 3/1981 | Japan . |
| 56-023532 | 3/1981 | Japan . |
| 56-023533 | 3/1981 | Japan . |
| 56-126649 | 5/1981 | Japan . |
| 56-126647 | 10/1981 | Japan . |
| 56-126648 | 10/1981 | Japan . |
| 56-126650 | 10/1981 | Japan . |
| 57-135243 | 8/1982 | Japan . |
| 58-048745 | 3/1983 | Japan . |
| 1-053042 | 3/1989 | Japan . |
| 1-066441 | 3/1989 | Japan . |
| 1-121538 | 5/1989 | Japan . |

Primary Examiner—Douglas Hart
Attorney, Agent, or Firm—Kenyon & Kenyon

[57] ABSTRACT

In an air-fuel ratio feedback system including a single air-fuel ratio sensor downstream of or within a three-way catalyst converter, an idling coarse-adjusting term is calculated integrally in accordance with the output of the air-fuel ratio sensor in an idling state of an engine. After the output of the air-fuel ratio sensor is inverted, the idling coarse-adjusting term is first rapidly changed, and thereafter, is slowly changed.

132 Claims, 32 Drawing Sheets

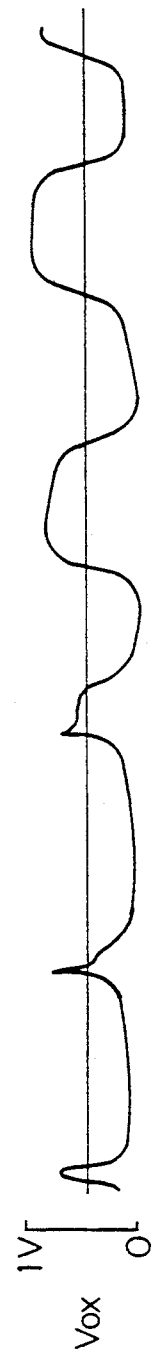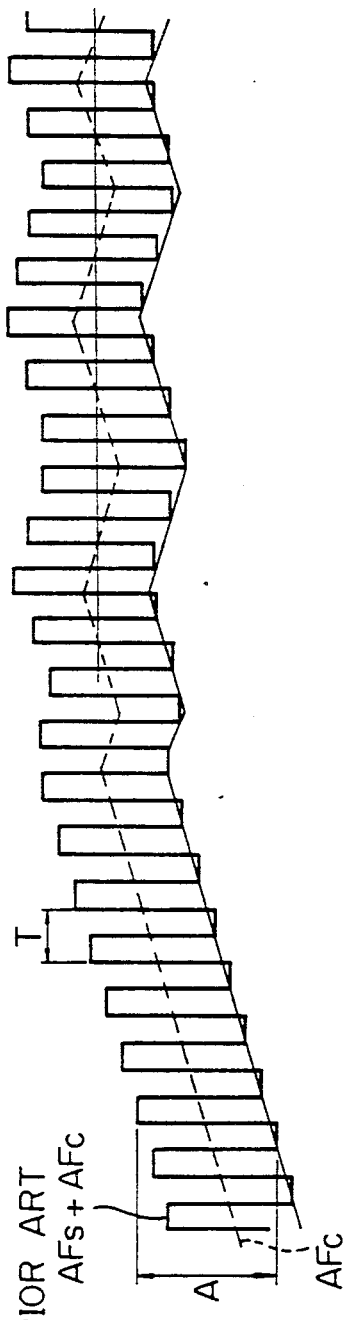
Fig.1A PRIOR ART
Fig.1B PRIOR ART

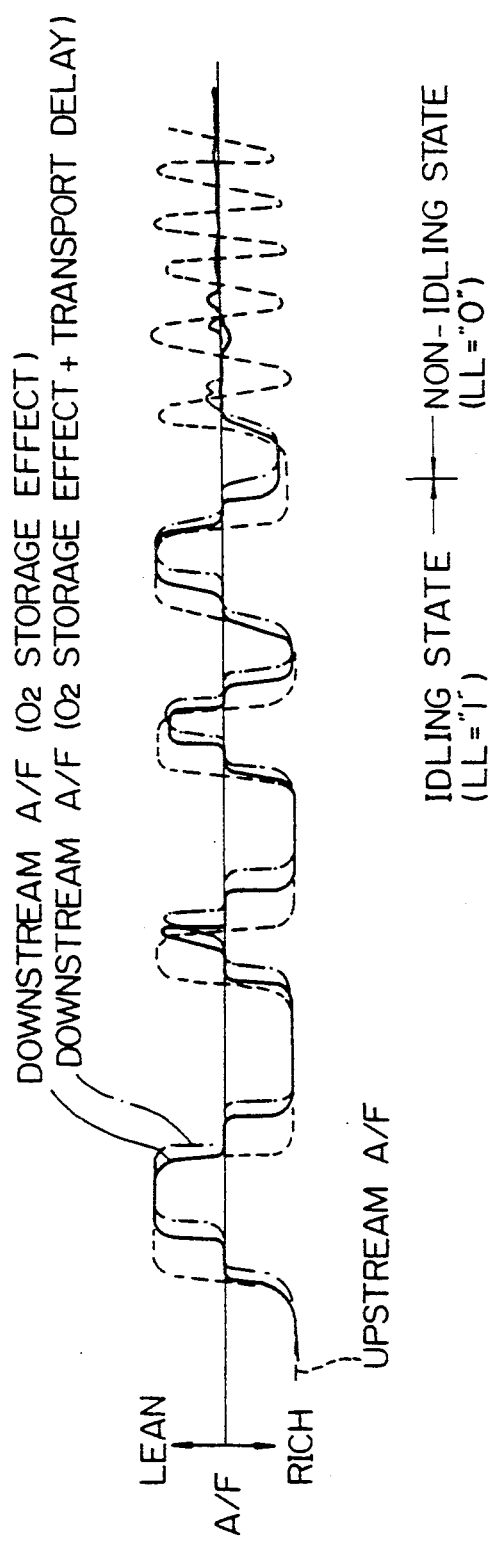

Fig.2 PRIOR ART
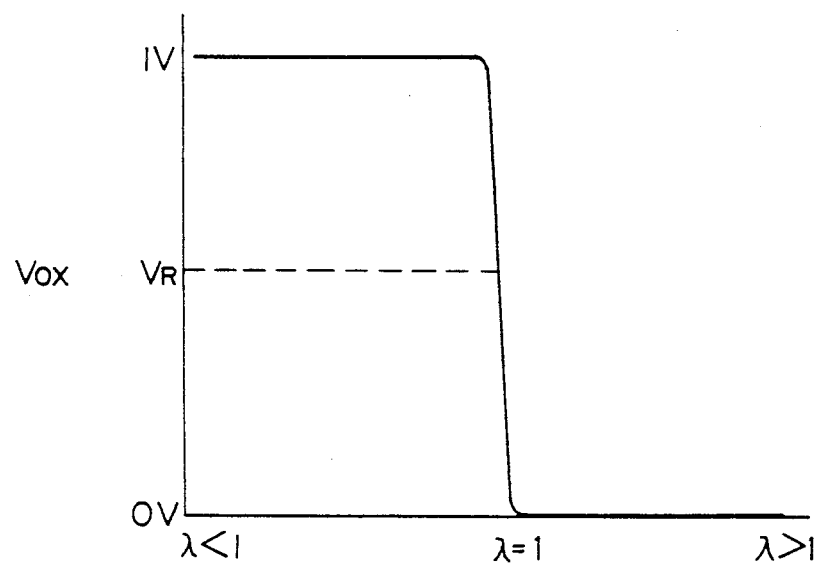
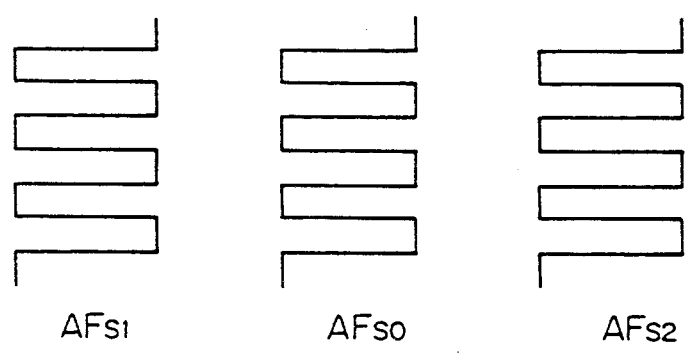
AFs1   AFs0   AFs2

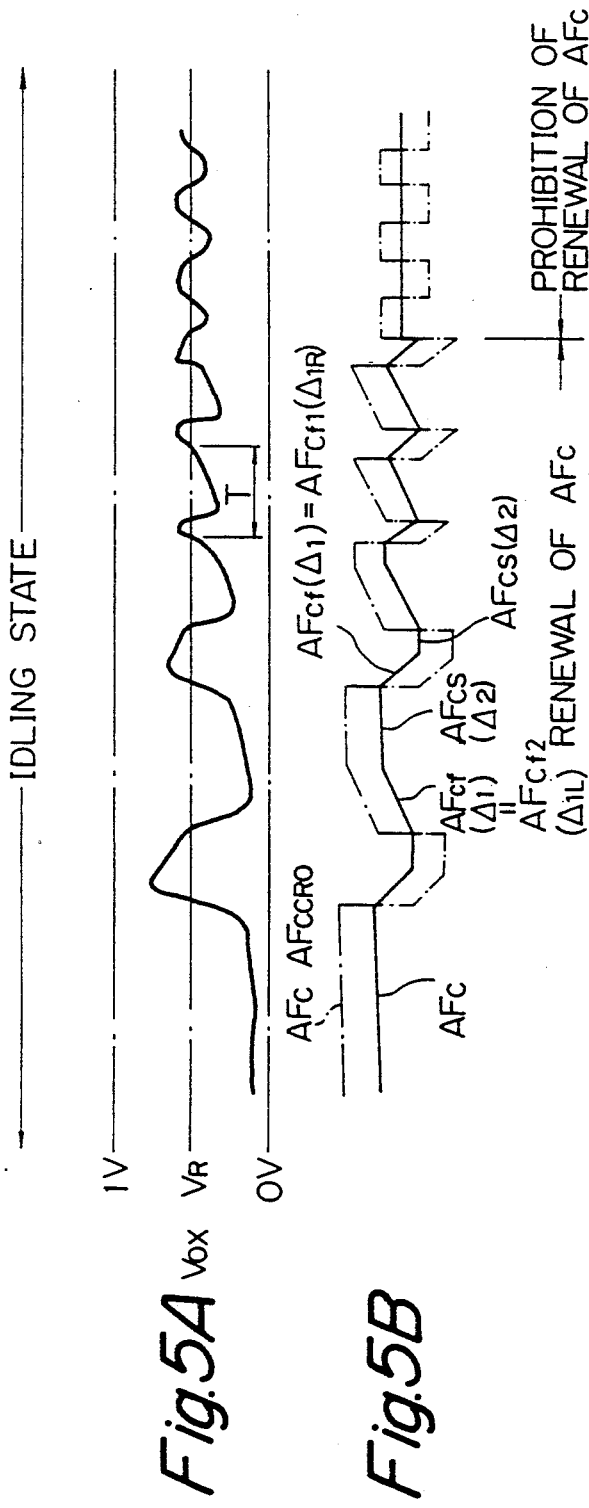

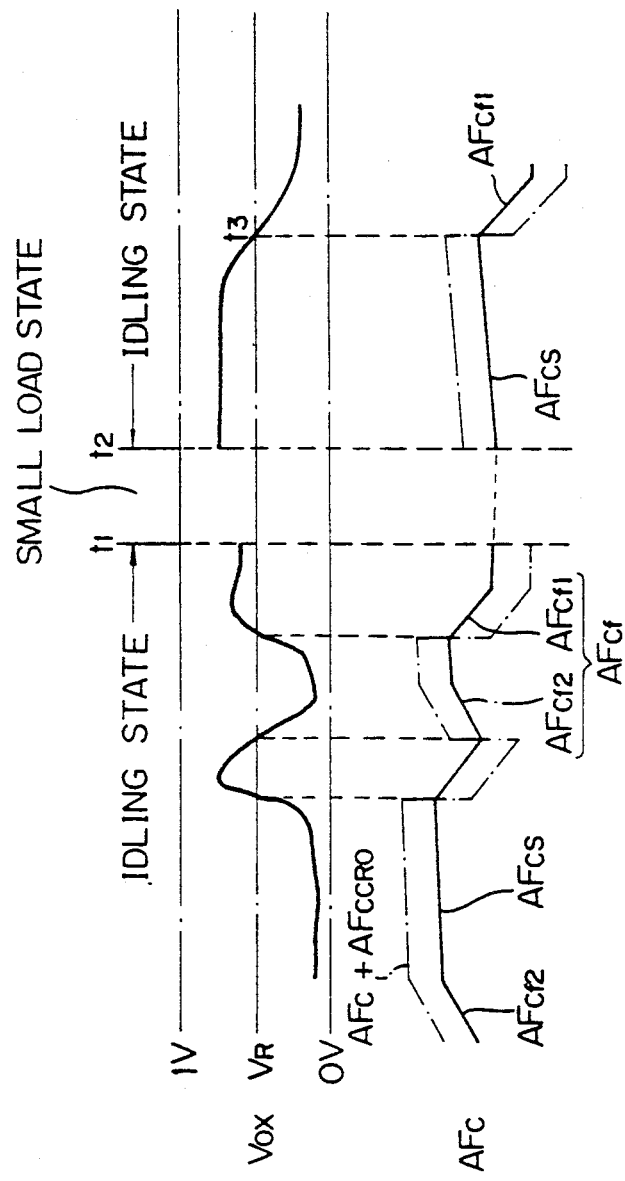

| Fig.8A | Fig.8B | Fig.8C |

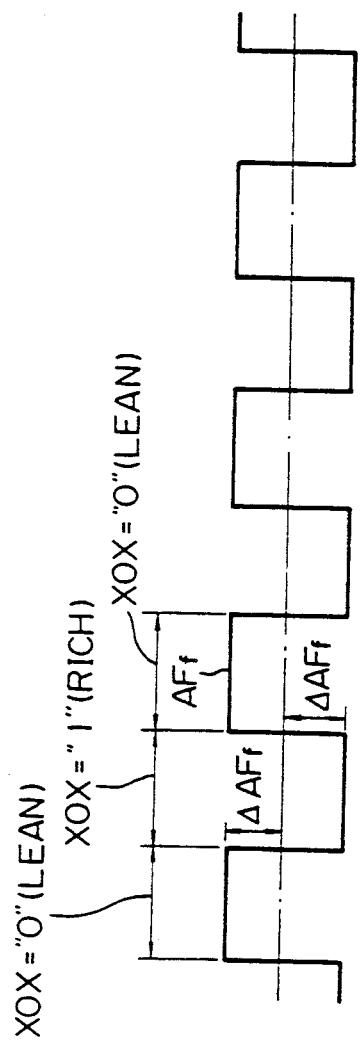

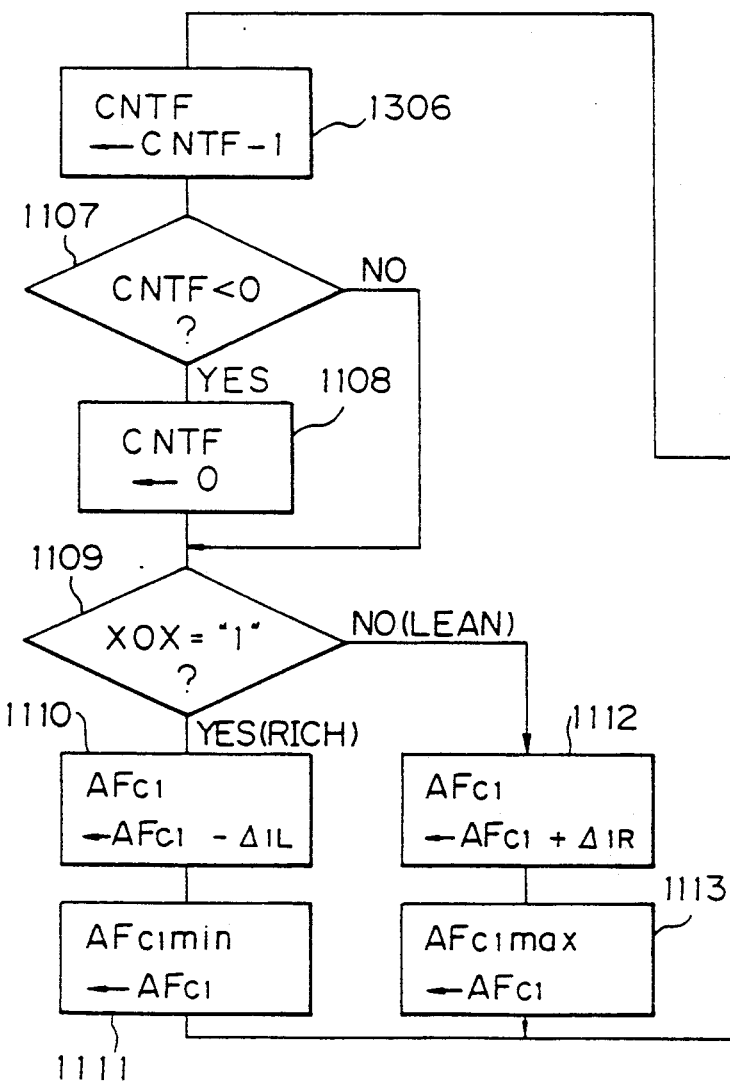

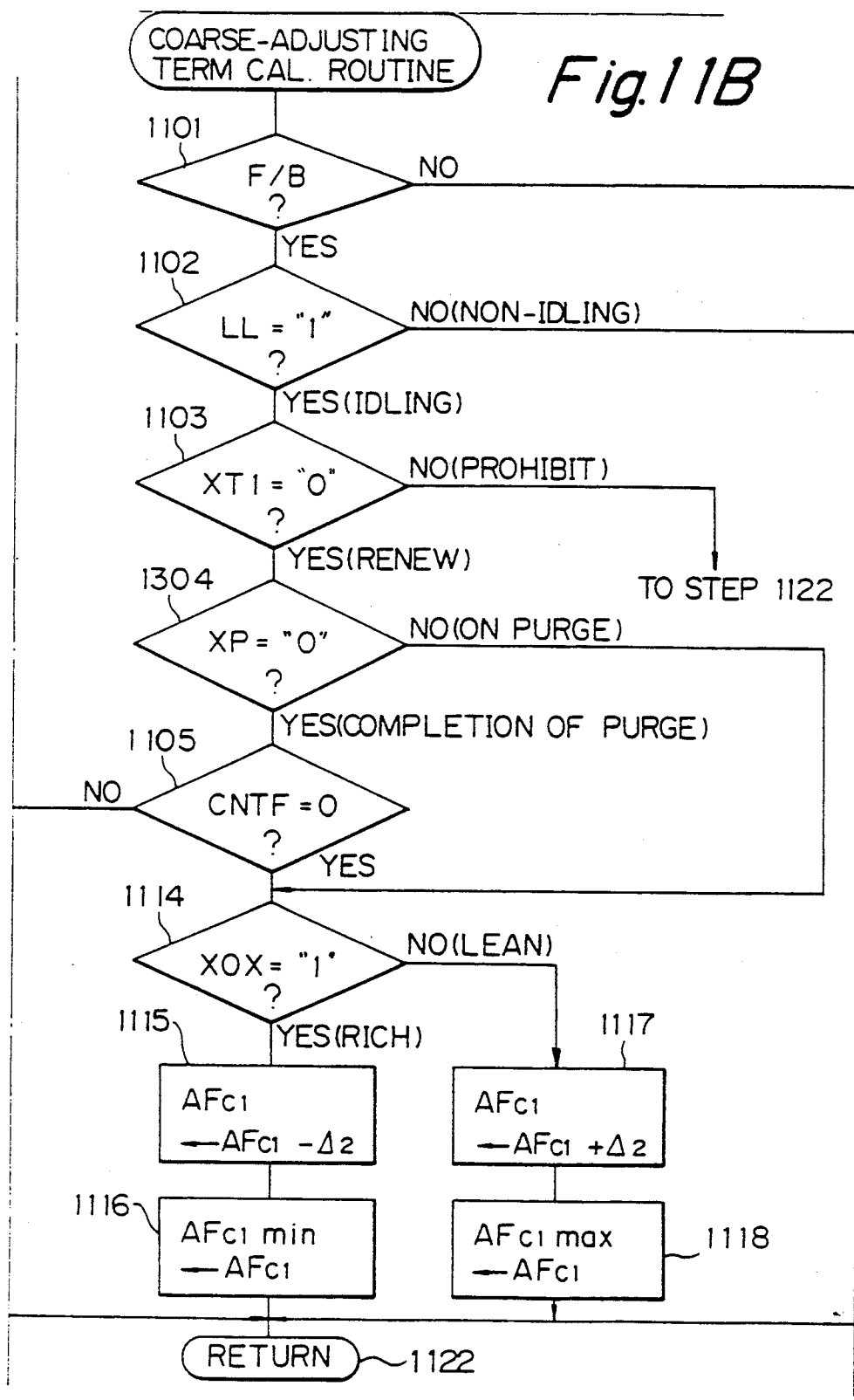

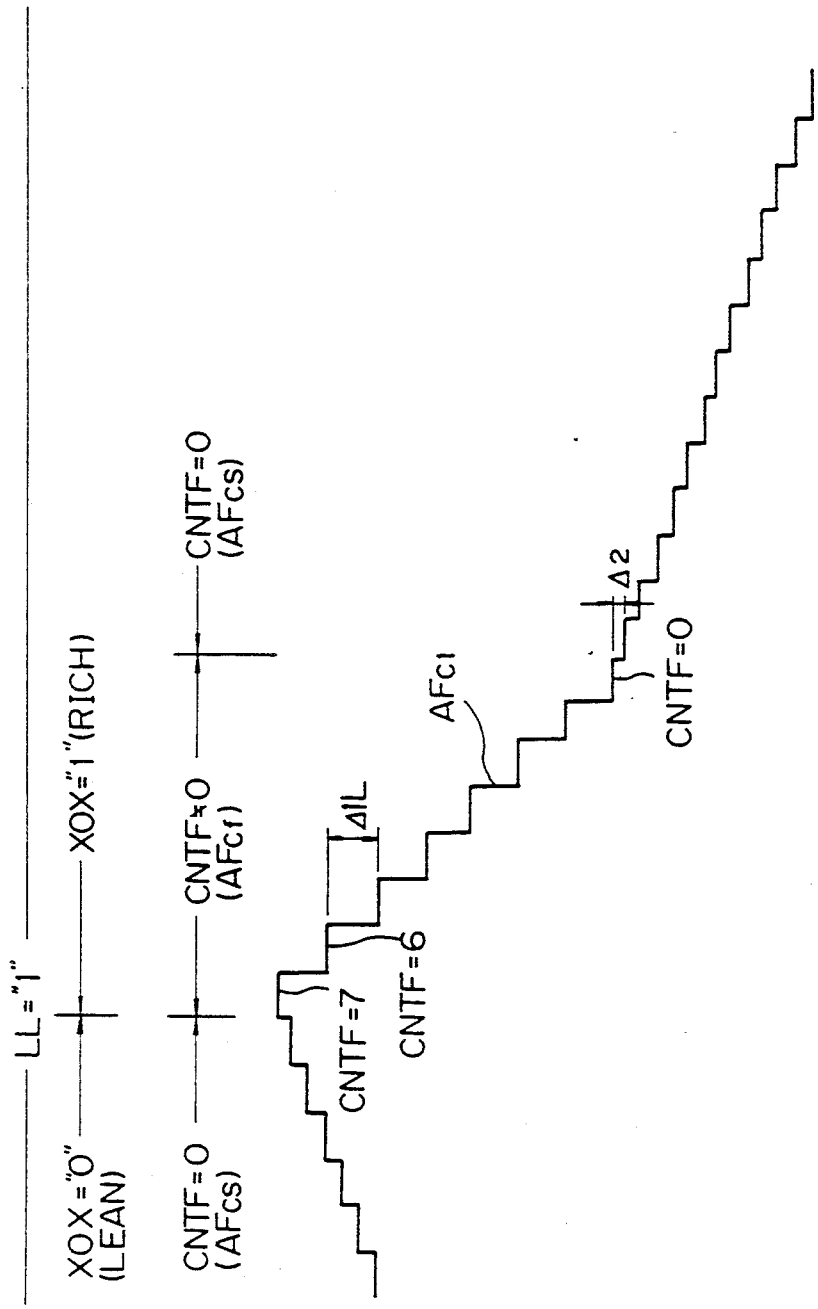

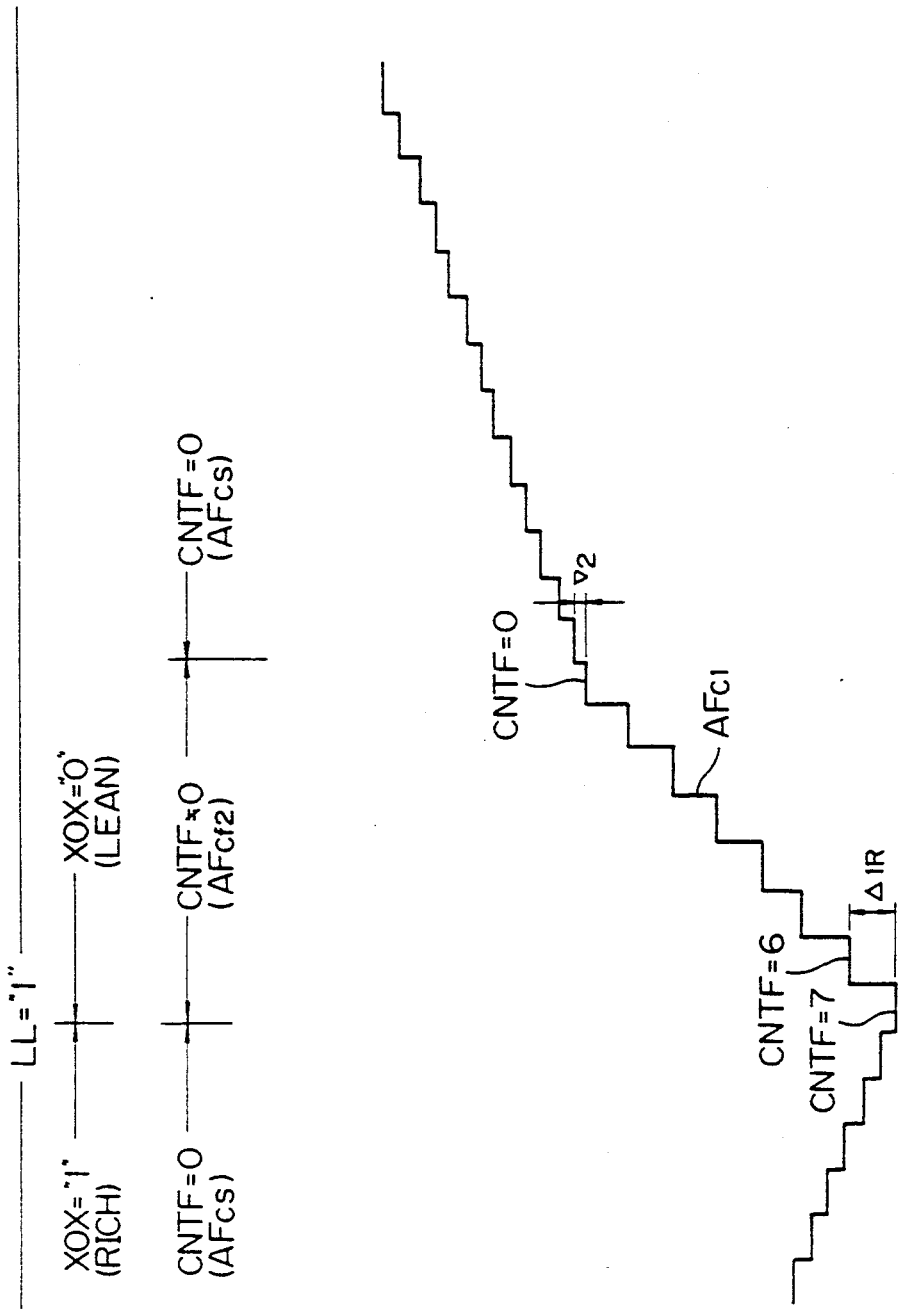

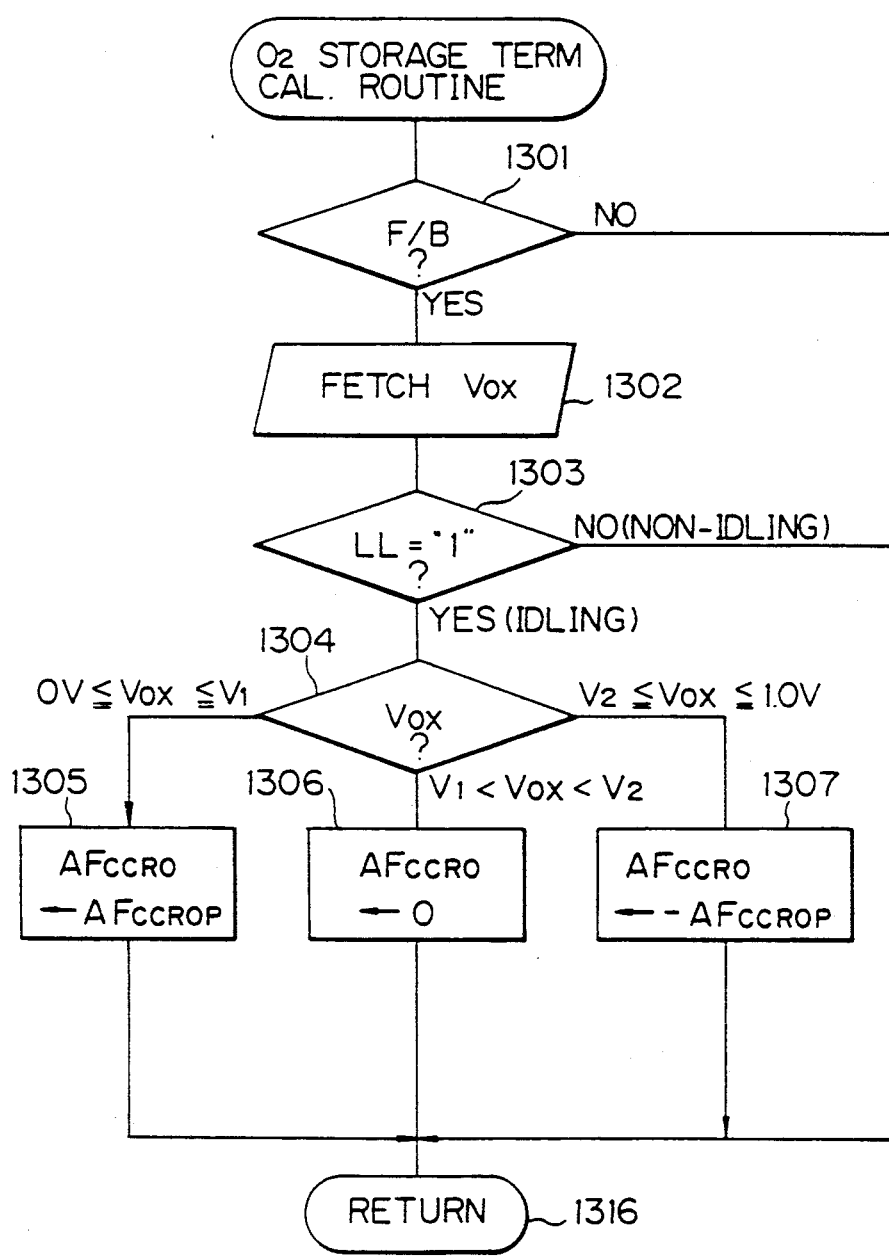

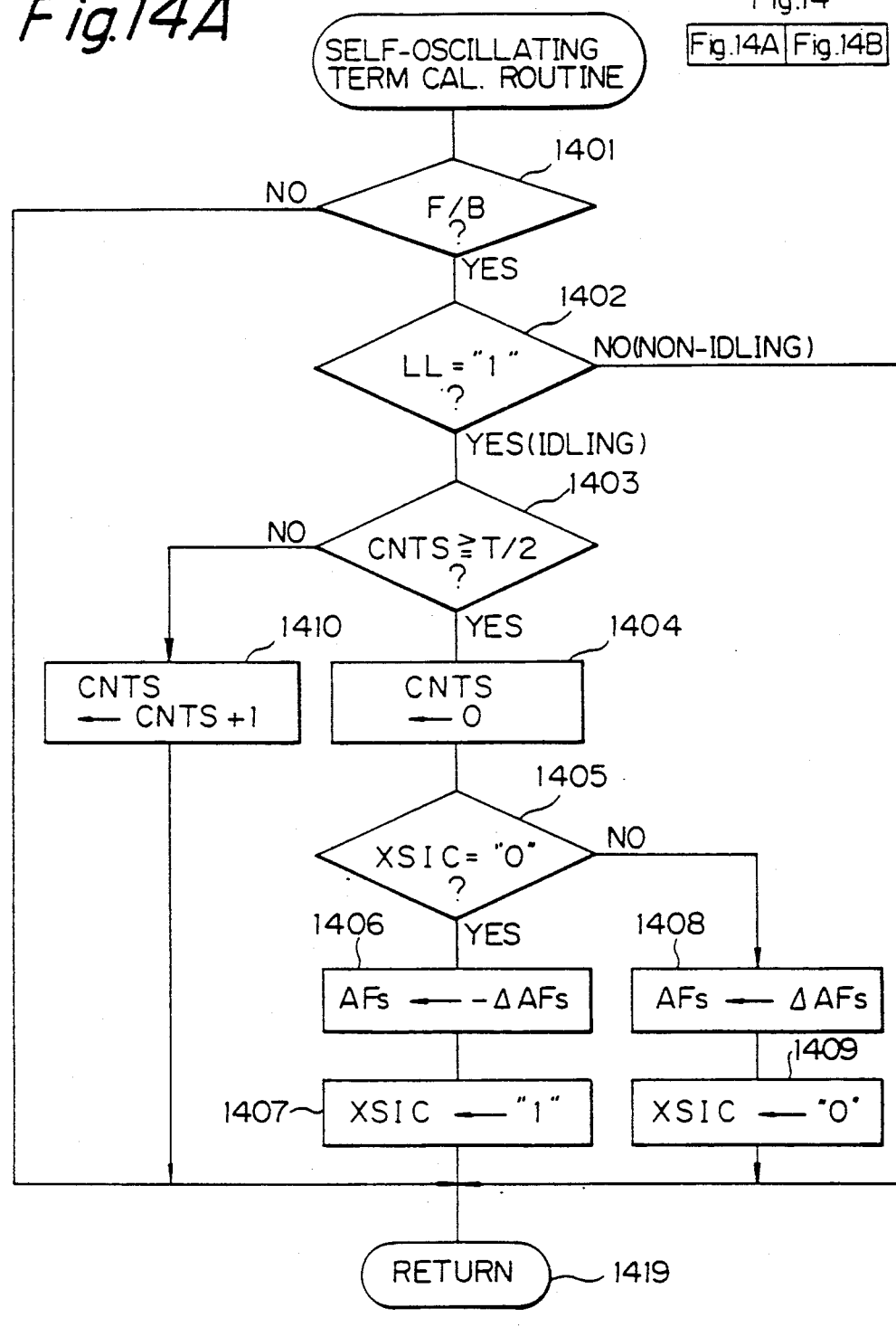

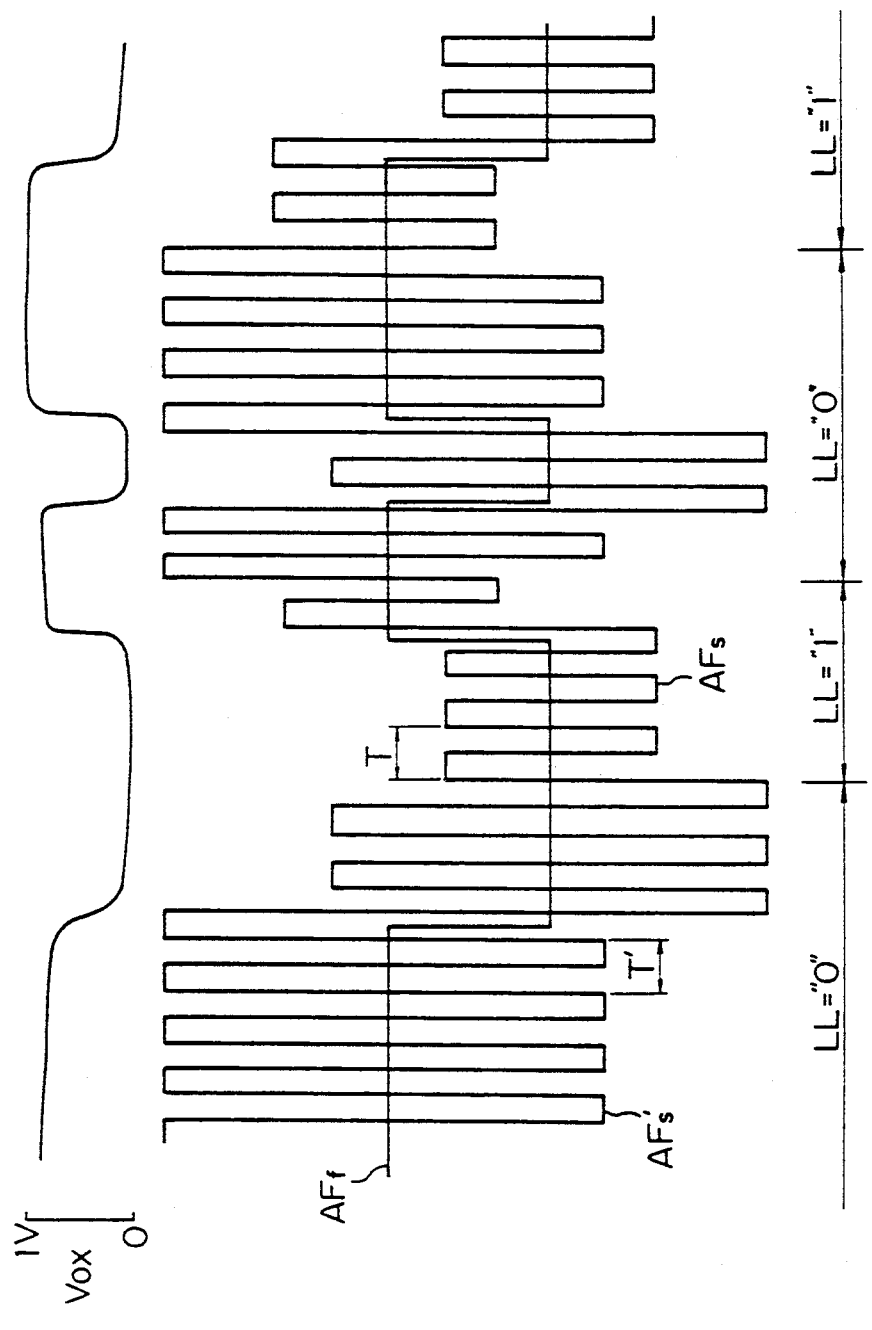

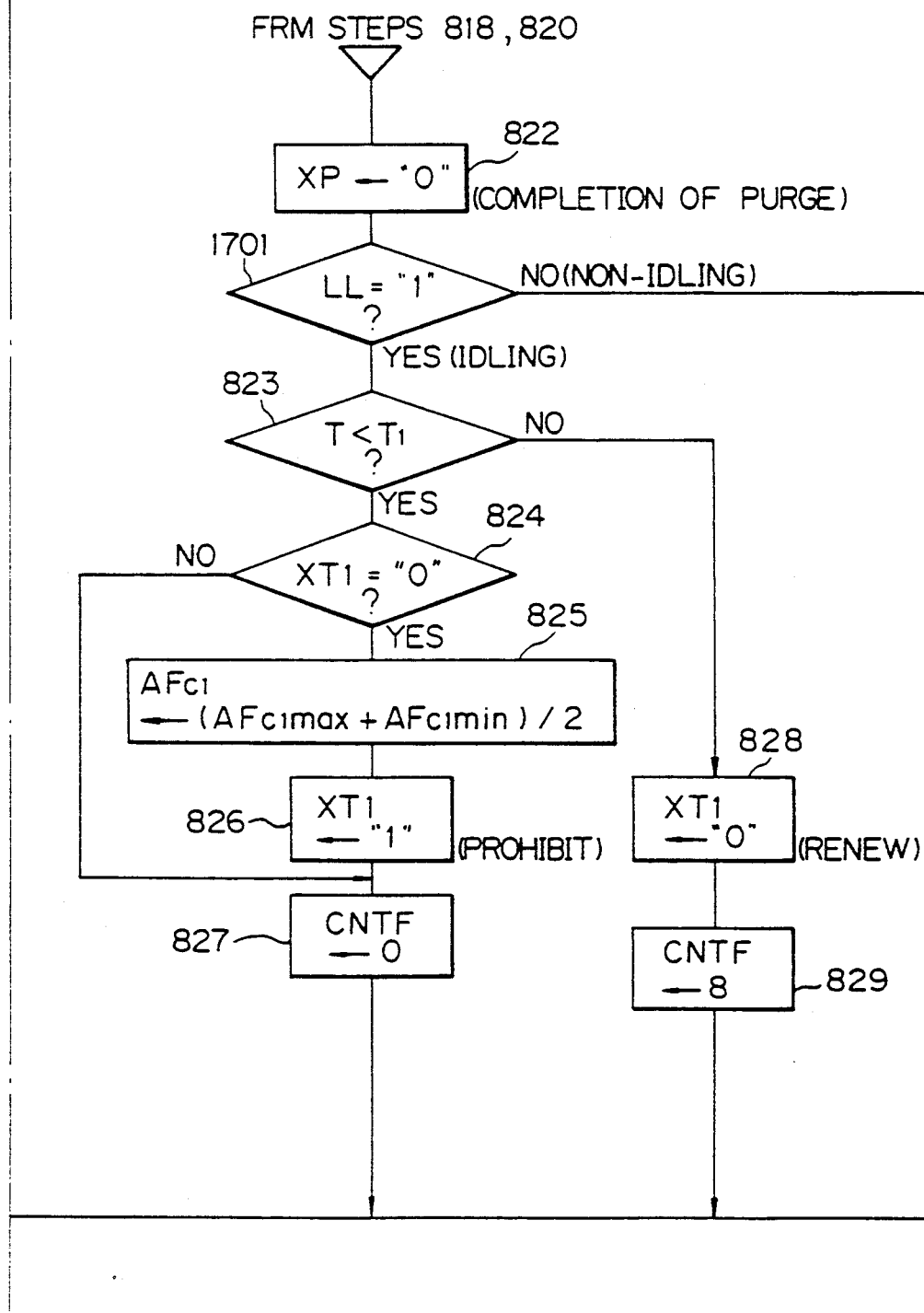

| Fig.18A | Fig.18B | Fig.18C |

AIR-FUEL RATIO FEEDBACK CONTROL SYSTEM HAVING SINGLE AIR-FUEL RATIO SENSOR DOWNSTREAM OF OR WITHIN THREE-WAY CATALYST CONVERTER

BACKGROUND OF THE INVENTION

1. Field of the Invention

The present invention relates to an air-fuel ratio feedback control system in an internal combustion engine having a single air-fuel ratio sensor downstream of or within a three-way reducing and oxidizing catalyst converter within an exhaust gas passage.

2. Description of the Related Art

As known air-fuel ratio feedback control systems using air-fuel ratio sensors ($O_2$ sensors), there exist a single $O_2$ sensor system having a single $O_2$ sensor and a double $O_2$ sensor system having two $O_2$ sensors upstream and downstream of the catalyst converter. Note, in a single $O_2$ sensor system, the $O_2$ sensor is disposed either upstream or downstream of the catalyst converter.

In a single $O_2$ sensor system having an $O_2$ sensor upstream of the catalyst converter, the $O_2$ sensor is disposed in an exhaust gas passage near the combustion chamber, i.e., near the concentration portion of an exhaust manifold upstream of the catalyst converter. In this system, however, the output characteristics of the $O_2$ sensor are directly affected by the non-uniformity or non-equilibrium of the exhaust gas. For example, when the air-fuel ratio actually indicates a rich state, but oxygen is still present, the output characteristics of the $O_2$ sensor fluctuate. Also, in an internal combustion engine having a plurality of cylinders, the output characteristics of the $O_2$ sensor are also directly affected by individual differences between the cylinders, and accordingly, it is impossible to detect the mean air-fuel ratio within the entire engine, and thus the accuracy of the controlled air-fuel ratio is low.

On the other hand, in a single $O_2$ sensor system having an $O_2$ sensor downstream of the catalyst converter, the non-uniformity or non-equilibrium of the detected exhaust gas can be eliminated, and the mean air-fuel ratio within the entire engine can be detected. In this system, however, due to the long distance between the $O_2$ sensor and the exhaust valves, and because the capacity and cleaning efficiency of the catalyst converter depends upon its $O_2$ storage effect, the response characteristics of the $O_2$ sensor are lowered, thus reducing the response characteristics of an air-fuel ratio feedback control system. As a result, the efficiency of the catalyst converter cannot be sufficiently exhibited, thus increasing HC, CO, and $NO_x$ emissions.

Also, in the above-mentioned double $O_2$ sensor system, an air-fuel ratio feedback control operation is carried out by the downstream $O_2$ sensor in addition to an air-fuel ratio feedback control operation by the upstream $O_2$ sensor. For example, the mean air-fuel ratio is detected by the downstream $O_2$ sensor to reflect an air-fuel ratio feedback control parameter such as skip amounts, and the air-fuel ratio feedback control for the entire system is carried out by the output of the upstream $O_2$ sensor and the air-fuel ratio feedback control parameter (see U.S. Pat. No. 4,693,076). Therefore, even if the output characteristics of the downstream $O_2$ sensor are not stable, good emission characteristics are obtained In this double $O_2$ sensor increasing the manufacturing cost, and further, when the frequency of the air-fuel ratio feedback control by the upstream $O_2$ sensor is increased by the aging of the parts of the engine or the like, the efficiency of the catalyst converter is lowered.

In view of the foregoing, the present inventor has already suggested a single $O_2$ sensor system having a downstream $O_2$ sensor in which a self-oscillating term $AF_s$ having a definite amplitude and a definite period is generated, and a mean value (coarse-adjusting term) $AF_c$ of the self-oscillating term $AF_s$ is changed in accordance with the output of the downstream $O_2$ sensor, to thereby exhibit a full efficiency of the catalyst converter (see Japanese Unexamined Patent Publication (Kokai) No. 64-66441 published on Mar. 31, 1989). In this single $O_2$ sensor, however, when the engine is in an idling state which sufficiently exhibits the $O_2$ storage effect of the catalyst converter, the coarse-adjusting term $AF_c$ is overcorrected and the exhaust emissions are increased. Particularly, in the idling state, the coarse-adjusting term $AF_c$ is overcorrected to the rich side, thus increasing HC and CO emissions. Further, immediately after the engine is transmitted from a non-idling state to an idling state, the coarse-adjusting term $AF_c$ is overcorrected, which also increases the emissions.

SUMMARY OF THE INVENTION

Therefore, an object of the present invention is to provide a single air-fuel ratio sensor system having an improved and superior cleaning function in the idling state.

Another object of the present invention is to provide a single air-fuel ratio sensor system having an improved and superior cleaning function even when the engine is transmitted from a non-idling state to an idling state.

According to the present invention, in an air-fuel ratio feedback system including a single air-fuel ratio sensor downstream of or within a three-way catalyst converter, an idling coarse-adjusting term $AF_c$ is calculated integrally in accordance with the output of the air-fuel ratio sensor in an idling state of the engine. In such an idling state, after the output of the air-fuel ratio sensor is inverted, the idling coarse-adjusting term $AF_c$ is first changed at a large integration speed, and thereafter, the idling coarse-adjusting term $AF_c$ is changed at a small integration speed thus avoiding the overcorrection of the idling coarse-adjusting term $AF_c$.

Also, the above-mentioned large integration speed of the idling coarse-idling term $AF_c$ toward the lean side is larger than that toward the rich side, thereby avoiding the overcorrection of the idling coarse-adjusting term to the rich side, and thus decreasing HC and CO emissions.

Further, when the engine is transmitted from a non-idling state to an idling state, the integration speed of the idling coarse-adjusting term $AF_c$ is forcibly made small for a predetermined time thereby improving the convergence of the controlled air-fuel ratio, and thus decreasing the exhaust emissions.

BRIEF DESCRIPTION OF THE DRAWINGS

The present invention will be more clearly understood from the description as set forth below with reference to the accompanying drawings.

FIGS. 1A and 1B are timing diagrams showing the inventor's suggested single air-fuel sensor system;

FIG. 2 is a graph showing the relationship between a self-oscillating wave and a cleaning function of a three-way catalyst converter;

FIGS. 3, 4A, and B are timing diagrams explaining the prior art;

FIGS. 5A, 5B, 6A, and 6B are timing diagrams explaining the present invention;

FIGS. 8A, 8B, 8C, 10A, 10B, 11A, 11B, 11C, 13A, 13A, 13B, 13C, 14A, 14B, 16, 17A, 17B, 17C, 17D, 18A, 18B, and 18C are flow charts showing the operation of the control circuit of FIG. 7;

FIG. 9 is a timing diagram explaining the flow chart of FIG. 8;

FIGS. 12A and 12B are timing diagrams explaining the flow chart of FIG. 11; and

FIGS. 15A and 15B are timing diagrams explaining the flow charts of FIG. 14.

DESCRIPTION OF THE PREFERRED EMBODIMENTS

First, the inventor's suggested single air-fuel ratio sensor system having a single downstream $O_2$ sensor will be explained with reference to FIGS. 1A, 1B, and 2. When the output $V_{OX}$ of the downstream $O_2$ sensor is changed as shown in FIG. 1A, the center of the self-oscillating term $AF_s$, having a definite amplitude A and a definite period T, i.e., the coarse-adjusting term $AF_c$, is changed in accordance with the output $V_{OX}$ of the $O_2$ sensor. In this case, when the output $V_{OX}$ of the $O_2$ sensor indicates a lean state, the coarse-adjusting term $AF_c$ is gradually increased, and when the output $V_{OX}$ of the $O_2$ sensor indicates a rich state, the coarse-adjusting term $AF_c$ is gradually decreased; i.e., the coarse-adjusting term $AF_c$ is integrally controlled.

Referring to FIG. 2, when the self-oscillating term $AF_s$ ($=AF_{s0}$) is oscillated around the stoichiometric air-fuel ratio ($\lambda=1$), the three-way catalyst converter exhibits a full cleaning function. When the self-oscillating term $AF_s$, which corresponds to $AF_{s1}$ or $AF_{S2}$, is oscillated around a rich air-fuel ratio ($\lambda<1$) or a lean air-fuel ratio ($\lambda>1$), the three-way catalyst converter cannot exhibit a full cleaning function. Therefore, to move the self-oscillating term $AF_{s1}$ or $AF_{s2}$ to $AF_{s0}$, the coarse-adjusting term (integration term) $AF_c$ is introduced into the control of the air-fuel ratio.

Nevertheless, in the prior art, when the feedback of the air-fuel ratio using the coarse-adjusting term $AF_c$ is carried out in an idling state which can sufficiently exhibit the $O_2$ storage effect of the catalyst converter, the convergence of the controlled air-fuel ratio to the stoichiometric air-fuel ratio is poor, or the controlled air-fuel ratio is overcorrected, thus increasing the HC, CO, and $NO_x$ emissions.

As shown in FIG. 3, when the air-fuel ratio upstream of the catalyst converter is changed as indicated by a dotted line, the air-fuel ratio downstream of the catalyst converter is delayed due to the $O_2$ storage effect of the catalyst converter, as indicated by a solid line. In addition, the duration of the $O_2$ storage effect of the catalyst converter is longer in an idling state than in a non-idling state. Nevertheless, the controlled downstream air-fuel ratio is further delayed as indicated by a dotted solid line due to the difference in phase between the gas introduced into the catalyst converter and the gas discharged therefrom. This transport delay is also longer in the idling state than in the non-idling state.

Figures 4A, 4B:
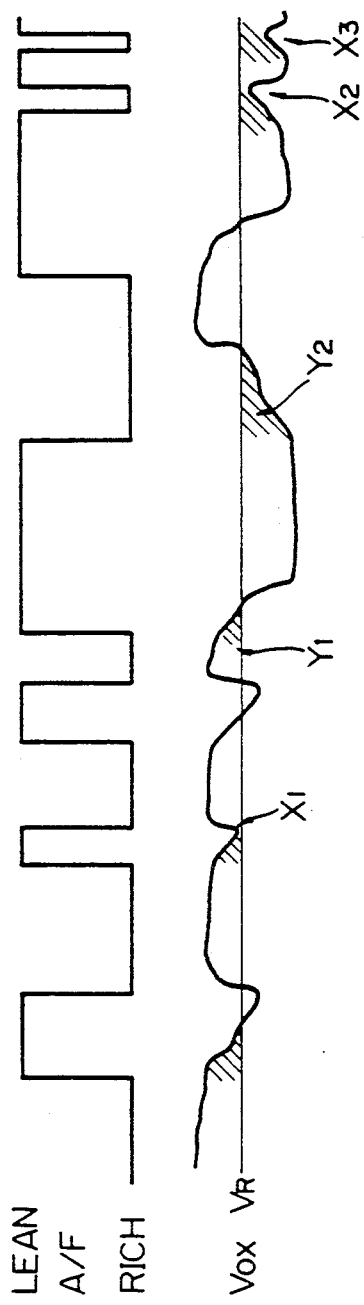

Further, as shown in FIGS. 4A and 4B, a purge time (response) for which the $O_2$ sensor remains in a rich or lean air-fuel ratio atmosphere depends upon the flow rate of gas. In FIGS. 4A and 4B, the $O_2$ storage effect of the catalyst converter is neglected, for simplicity, and FIGS. 4A and 4B show the case where the flow rate of gas is small. That is, as indicated by shaded portions, when the flow rate of gas is small, the change of the output of the $O_2$ sensor from the rich side to the lean side and from the lean side to the rich side are both delayed. At worst, as indicated by arrows $X X_2$, and $X_3$, the output $V_{OX}$ of the $O_2$ sensor is not inverted. Such a purge time of the $O_2$ sensor is also longer in an idling state than in a non-idling state.

Also, when the element temperature of the $O_2$ sensor is lowered, the $O_2$ sensor tends to generate a lean output, as indicated by arrows $Y_1$ and $Y_2$, so that the change ($Y_2$) of the output of the $O_2$ sensor from the lean side to the rich side is smaller than the change ($Y_1$) of the output of the $O_2$ sensor from the rich side to the lean side, thus inviting an overrich control of the air-fuel ratio.

Therefore, when the controlled air-fuel ratio is greatly deviated from the stoichiometric air-fuel ratio due to the $O_2$ storage effect of the catalyst converter, the gas transport delay, the purge time of the $O_2$ sensor, the lean tendency of the output of the $O_2$ sensor, and the like, it will take a long time to converge the controlled air-fuel ratio to the stoichiometric air-fuel ratio by using the gradually changing coarse-adjusting term $AF_c$ thus increasing the HC, CO, and $NO_x$ emissions. Although it is possible to increase the convergence speed of the controlled air-fuel ratio to the stoichiometric air-fuel ratio by increasing the integration speed of the coarse-adjusting term $AF_c$ the change of the controlled air-fuel ratio is, in this case, too rapid, and accordingly, the controlled air-fuel ratio is overcorrected, thus increasing the HC, CO, and $NO_x$ emissions.

Further, when the engine remains in a non-idling state such as in a small load state, for a long time, an excess of $O_2$ or an excess of HC and CO may be stored in the catalyst converter due to the small flow rate of gas and the small response speed of the $O_2$ sensor. Therefore, when the engine is transmitted from a long non-idling state, such as a long small load state, to an idling state, and the feedback control of the air-fuel ratio using the coarse-adjusting term having a large integration speed is carried out, the $O_2$ sensor may erroneously detect the air-fuel ratio due to such an excess of $O_2$ or HC (and CO). As a result, the controlled air-fuel ratio is overcorrected and the convergence of the controlled air-fuel ratio to the stoichiometric air-fuel ratio is faulty.

FIGS. 5A and 5B show the principle of the present invention. In an idling state, the coarse-adjusting term $AF_c$ as shown in FIG. 5B is calculated in accordance with the output $V_{OX}$ of the $O_2$ sensor as shown in FIG. 5A. In this case, the coarse-adjusting term $AF_c$ defined by $AF_{cf}$ is renewed at a large integration speed $\Delta_1$ for a predetermined time after the output $V_{OX}$ of the $O_2$ sensor is inverted. Thereafter, the coarse-adjusting term $AF_c$ defined by is renewed at a small integration speed $\Delta_2$. Therefore, the controlled air-fuel ratio is rapidly brought close to the periphery of the stoichiometric air-fuel ratio by using the large integration speed $\Delta_1$. Thereafter, the controlled air-fuel ratio is slowly brought close to the stoichiometric air-fuel ratio by using the small integration speed $\Delta_2$. This avoids the overcorrection of the controlled air-fuel ratio.

Also, in FIGS. 5A and 5B, when the repetition period T of the output $V_{OX}$ of the $O_2$ sensor is smaller than a predetermined period $T_1$, the calculation of the coarse-adjusting term $AF_c$ is prohibited. That is, when the controlled air-fuel ratio reaches the stoichiometric air-fuel ratio, the repetition period T of the output $V_{OX}$ of the $O_2$ sensor becomes small. Therefore, in this case, the coarse-adjusting term $AF_c$ remains at a definite value, so that the controlled air-fuel ratio is little deviated from the stoichiometric air-fuel ratio.

Thus, according to the feedback control of the air-fuel ratio as shown in FIGS. 5A and 5B, convergence of the controlled air-fuel ratio to the stoichiometric air-fuel ratio is improved.

Further, in FIGS. 5A and 5B, the integration speed $\Delta_1$ of the coarse-adjusting term $AF_c$ is asymmetrical. That is, the integration speed $\Delta_1$ ($=\Delta_{1R}$) for the coarse-adjusting term $AF_{cf}$ ($=AF_{cf1}$) where the output $V_{OX}$ of the $O_2$ sensor indicates a rich state is larger than the integration speed $\Delta_1$ ($=\Delta_{1L}$) for the coarse-adjusting term $AF_{cf}$ ($=AF_{cf2}$) where the output $V_{OX}$ of the $O_2$ sensor indicates a lean state. This avoids an overrich state of the controlled air-fuel ratio.

Further, in FIGS. 6A and 6B, which also shows the principle of the present invention, when the engine is switched from a non-idling state such as a small load state to an idling state, the coarse-adjusting term $AF_c$ is calculated at the small integration speed $\Delta_2$ for a predetermined time, for example, until the output $V_{OX}$ of the $O_2$ sensor is inverted at time $t_3$. This compensates for the insufficient purge period defined by times $t_1$ to $t_2$. As a result, the overcorrection of the controlled air-fuel ratio is avoided, thus improving the convergence of the controlled air-fuel ratio to the stoichiometric air fuel ratio.

Figure 7:
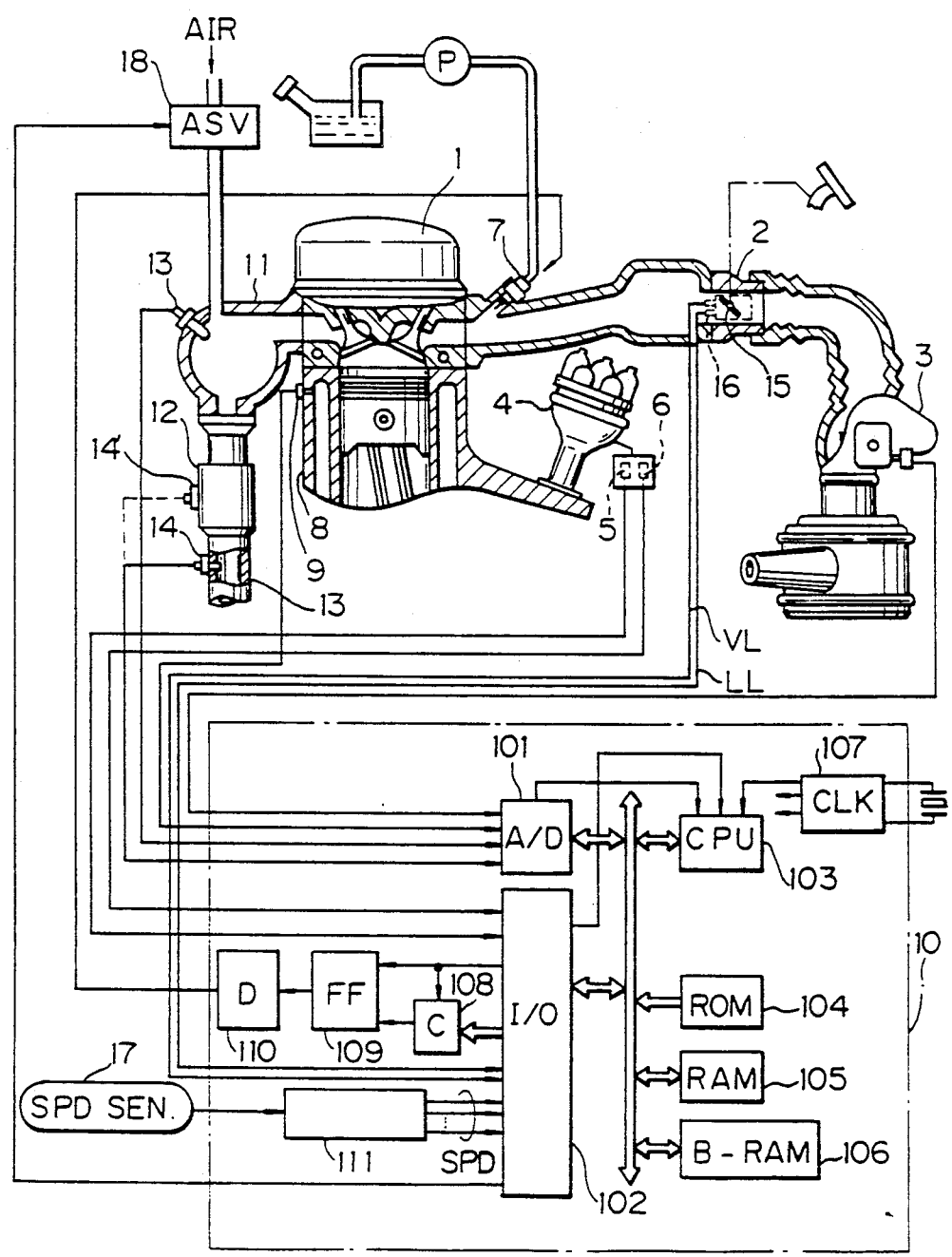
FIG. 7 is a schematic view of an internal combustion engine according to the present invention.

In FIG. 7, which illustrates an internal combustion engine according to the present invention, reference numeral 1 designates a four-cycle spark ignition engine disposed in an automotive vehicle. Wherein an air-intake passage 2 of the engine 1 is provided with a potentiometer-type airflow meter 3 for detecting the amount of air drawn into the engine 1, to generate an analog voltage signal in proportion to the amount of air flowing therethrough. The signal of airflow meter 3 is transmitted to a multiplexer-incorporating analog-to-digital (A/D) converter 101 of a control circuit 10.

Disposed in a distributor 4 are crank angle sensors 5 and 6 for detecting the angle of the crankshaft (not shown) of the engine 1.

In this case, the crank angle sensor 5 generates a pulse signal at every 720° crank-angle (CA) and the crank-angle sensor 6 generates a pulse signal at every 30° CA. The pulse signals of the crank angle sensors 5 and 6 are supplied to an input/output (I/O) interface 102 of the control circuit 10. Further, the pulse signal of the crank angle sensor 6 is then supplied to an interruption terminal of a central processing unit (CPU) 103.

Also provided in the air-intake passage 2 is a fuel injection valve 7 for supplying pressurized fuel from the fuel system to the air-intake port of the cylinder of the engine 1. In this case, other fuel injection valves are provided for other cylinders, but these are not shown in FIG. 7.

Disposed in a cylinder block 8 of the engine 1 is a coolant temperature sensor 9 for detecting the temperature of the coolant. The coolant temperature sensor 9 generates an analog voltage signal in response to the temperature THW of the coolant, and transmits that signal to the A/D converter 101 of the control circuit 10.

Provided in an exhaust system on the downstream-side of an exhaust manifold 11 is a three-way reducing and oxidizing catalyst converter 12 which removes three pollutants CO, HC, and $NO_x$ simultaneously from the exhaust gas.

Provided in an exhaust pipe 13 downstream of the catalyst converter 12 is an $O_2$ sensor 14 for detecting the concentration of oxygen composition in the exhaust gas. The $O_2$ sensor 14 generates a output voltage signal and transmits the signal to the A/D converter 101 of the control circuit 10. Note that an $O_2$ sensor 14, can be located within the catalyst converter 12, instead of the $O_2$ sensor 14 downstream of the catalyst converter 12.

Reference 15 designates a throttle valve, and 16 designates an throttle sensor which incorporates an idle switch for detecting when the throttle valve 15 is fully closed, and a full switch for detecting whether or not the opening of the throttle valve 15 is larger than a predetermined value, such as 70°. The output LL of the idle switch and the output VL of the full switch are supplied to the I/O interface $1O_2$ of the control circuit 10.

Reference 17 designates a vehicle speed sensor formed, for example, by a permanent magnet and a lead switch. The output of the vehicle speed sensor 17 is supplied to a vehicle speed forming circuit 111 of the control circuit 10, which circuit 111 generates binary data inversely proportional to the vehicle speed SPD.

Reference 18 designates an air suction valve of a secondary air supply system. When the engine is in a predetermined deceleration state or an idling state, the air suction valve 18 is opened to introduce secondary air into the exhaust manifold 11, thus reducing the HC and CO emissions. Also, when the coolant temperature THW is low, the air suction valve 18 is closed to stop the introduction of secondary air into the exhaust manifold 11, thereby preventing overheating of the exhaust system. The air suction valve 18 is controlled, via a vacuum switch valve (not shown), by the control circuit 10 using the data of the engine speed $N_e$, the vehicle speed SPD, the idle switch LL, the coolant temperature THW and the like.

The control circuit 10, which may be constructed by a microcomputer, further comprises a central processing unit (CPU) 103, a read-only memory (ROM) 104 for storing a main routine and interrupt routines such as a fuel injection routine, an ignition timing routine, tables (maps), constants, etc., a random access memory 105 (RAM) for storing temporary data, a backup RAM 106, a clock generator 107 for generating various clock signals, a down counter 108, a flip-flop 109, a driver circuit 110, and the like.

Note, that the battery (not shown) is connected directly to the backup RAM 106 and, therefore, the content thereof is not erased even when the ignition switch (not shown) is turned OFF.

The down counter 108, the flip-flop 109, and the driver circuit 110 are used for controlling the fuel injection valve 7. Namely, when a fuel injection amount TAU is calculated in a TAU routine, which will be later explained, the amount TAU is preset in the down counter 108, and simultaneously, the flip-flop 109 is set. As a result, the driver circuit 110 initiates the activation of the fuel injection valve 7. On the other hand, the down counter 108 counts up the clock signal from the clock generator 107, and finally generates a logic "1" signal from the borrow-out terminal of the down counter 108, to reset the flip-flop 109, so that the driver circuit 110 stops the activation of the fuel injection valve 7. Thus, the amount of fuel corresponding to the fuel injection amount TAU is injected into the fuel injection valve 7.

Interruptions occur at the CPU 103 when the A/D converter 101 completes an A/D conversion and generates an interrupt signal; when the crank angle sensor 6 generates a pulse signal; and when the clock generator 107 generates a special clock signal.

The intake air amount data Q of the airflow meter 3 and the coolant temperature data THW of the coolant sensor 9 are fetched by an A/D conversion routine(s) executed at predetermined intervals, and then stored in the RAM 105; i.e., the data Q and THW in the RAM 105 are renewed at predetermined intervals. The engine speed $N_e$ is calculated by an interrupt routine executed at 30° CA, i.e., at every pulse signal of the crank angle sensor 6, and is then stored in the RAM 105.

Figures 8, 8A:
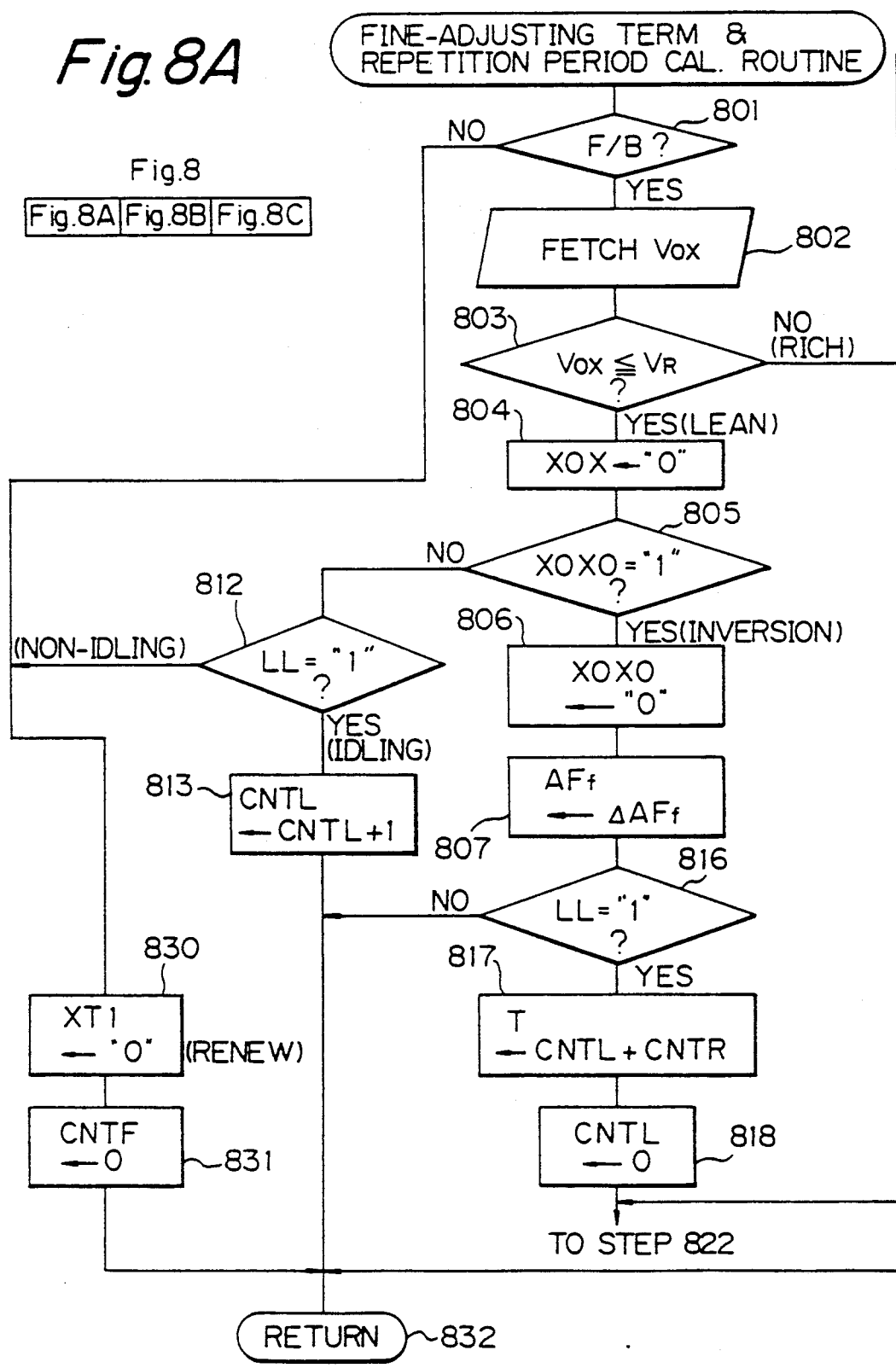
Figure 8B:
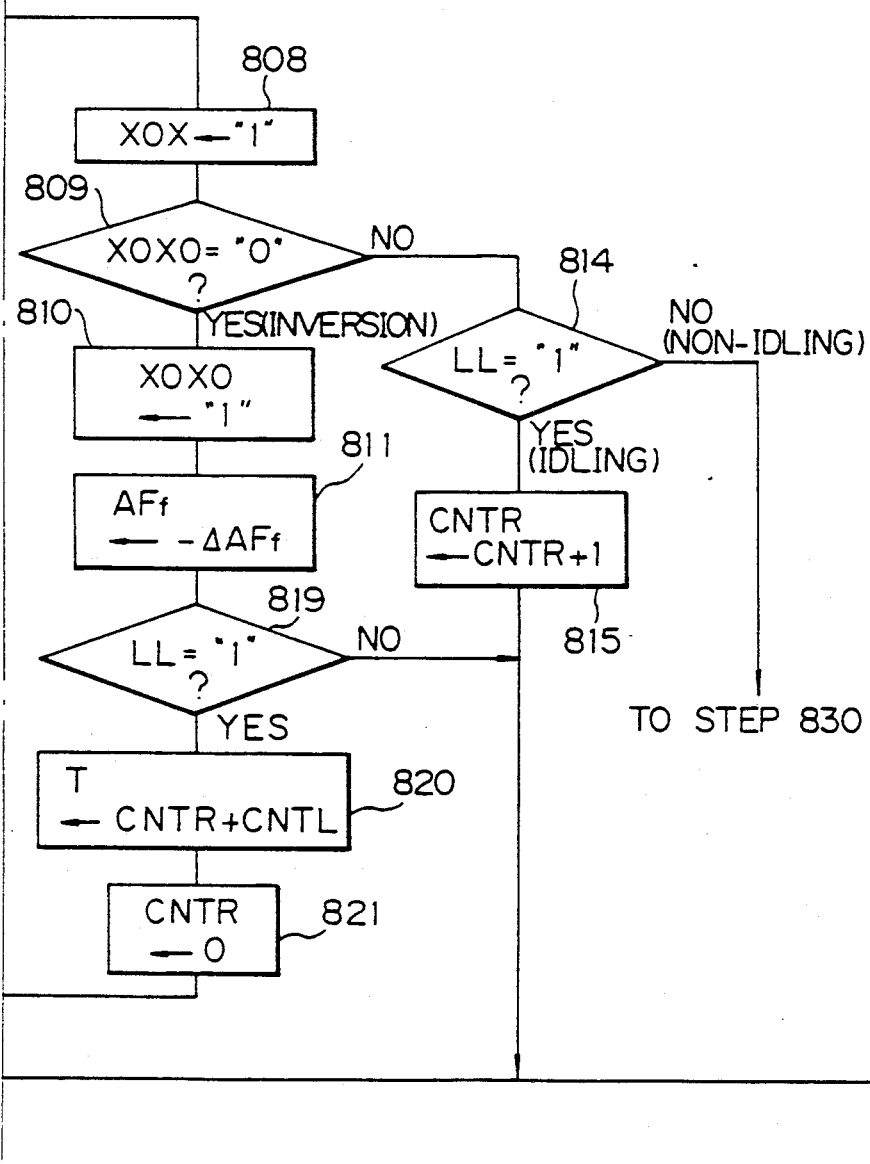
Figure 8C:
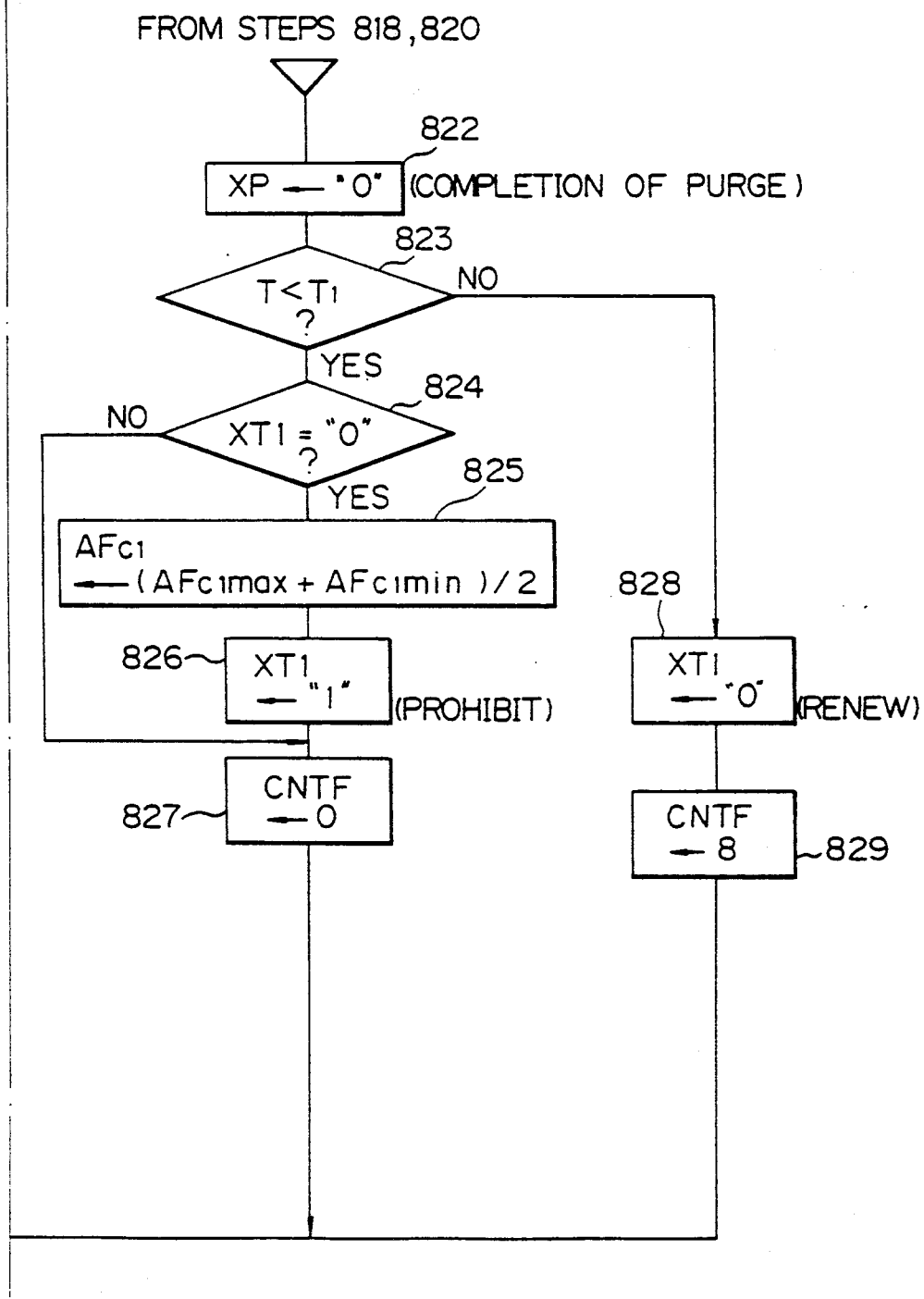

FIG. 8 is a routine for calculating a fine-adjusting term $AF_f$ in accordance with the output $V_{OX}$ of the $O_2$ sensor 14 and an inversion period (repetition period) of the $O_2$ sensor 14 executed at a predetermined time such as 4 ms.

At step 801, it is determined whether or not all of the feedback control (closed-loop control) conditions by the $O_2$ sensor 14 are satisfied. The feedback control conditions are as follows.

i) the coolant temperature THW is higher than 40° C.;
ii) the engine is not in a starting state;
iii) the engine is not in a fuel incremental state after a starting state;
iv) the power fuel incremental amount FPOWER IS 0, i.e., the fuel switch VL of the throttle sensor 16 is turned OFF;
v) the engine is not in a fuel cut-off state;
vi) the $O_2$ sensor 14 is in an activated state; and
vii) the secondary air-suction in accordance the output LL of the idle switch, and the coolant temperature THW, and the like is not carried out.

Note that the determination of activation/nonactivation of the $O_2$ sensor 14 is carried out by determining whether or not the output volta $V_{OX}$ of the $O_2$ sensor 14 is lower than a predetermined value. Of course, other feedback control conditions are introduced as occasion demands, but an explanation of such other feedback control conditions is omitted.

If one or more of the feedback control conditions is not satisfied, the control proceeds via steps 830 and 831 to step 832, to thereby carry out an open-loop control operation. That is, at step 830, a renewal prohibit flag XT1 for an idling coarse-adjusting $AF_{cl}$, which will be later explained, is reset, i.e., initialized, and at step 831, a counter value CNTF for carrying out the control of the integration speed of the idling coarse-adjusting term $AF_{cl}$ is cleared to lower this integration speed.

Contrary to the above, at step 801, if all of the feedback control conditions are satisfied, the control proceeds to steps 802 to 829. Steps 802 to 811 are used for calculating a fine-adjusting term $AF_f$, and steps 812 to 821 are used for calculating a repetition period T of the output $V_{OX}$ in an idling state. Step 822 is used for declaring that a purge of the $O_2$ sensor 14 is completed by the inversion of the output $V_{OX}$ of the $O_2$ sensor 14, which will be later explained with reference to FIGS. 10A and 10B. Steps 823 to 829 are used for determining whether the calculation of the idling coarse-adjusting $AF_{cl}$ is prohibited or carried out.

Steps 802 to 811 are explained below.

At step 802, an A/D conversion is performed upon the output voltage $V_{OX}$ of the $O_2$ sensor 14, and the A/D converted value thereof is then fetched from the A/D converter 101. Then at step 803, the voltage $V_{OX}$ is compared with a reference voltage $V_R$ such as 0.45 V, thereby determining whether the current air-fuel ratio detected by the $O_2$ sensor 14 is on the rich side or on the lean side with respect to the stoichiometric air-fuel ratio.

If $V_{OX} \leq V_R$, which means that the current air-fuel ratio is lean, the control proceeds to step 804, which sets "0" in an air-fuel ratio flag XOX. At step 805, it is determined whether or not a previous air-fuel ratio flag XOXO is "1" (rich), i.e., the air-fuel ratio flag XOX is inverted. As a result, only when the air-fuel ratio flag XOX is inverted does the control proceed to step 806, which inverts the previous air-fuel ratio flag XOXO, and then at step 807, the fine-adjusting term $AF_f$ is made $\Delta AF_f$ (definite) as shown in FIG. 9. Then the control proceeds to step 816.

On the other hand, at step 803, $V_{OX} > V_R$, which means that the current air-fuel ratio is rich, the control proceeds to step 808, which sets "1" in the air-fuel ratio flag XOX. At step 809, it is determined whether or not the previous air-fuel ratio flag XOXO is "0" (lean), i.e., the air-fuel ratio flag XOX is inverted. As a result, only when the air-fuel ratio flag XOX is inverted does the control proceed to step 810 which inverts the previous air-fuel ratio flag XOXO, and then at step 811, the fine-adjusting term $AF_f$ is made $-\Delta AF_f$ (definite) as shown in FIG. 9. Then the control proceeds to step 819.

Thus, according to steps 802 to 811 of FIG. 8, the fine-adjusting term $AF_f$ has a waveform which is skipped at every reversion of the output $V_{OX}$ of the $O_2$ sensor 14 as shown in FIG. 9. Namely, the control of the fine-adjusting term $AF_f$ corresponds to a skip control, and thus, a self-oscillating waveform is formed by the output $V_{OX}$ of the $O_2$ sensor 14 per se.

Steps 812 to 821 are explained below.

When the flag XOX is not inverted at step 805, the control proceeds to step 812 which determines whether or not the idle switch of the throttle sensor 16 is turned ON (LL="1"), i.e., whether the engine is in an idling state or in a non-idling state. As a result, only when the engine is in an idling state does the control proceed to step 813, which measures a lean state duration by counting up a counter value CNTL by t1. Similarly, when the flag XOX is not inverted at step 809, the control proceeds to step 814 which determines whether or not the idle switch of the throttle sensor 16 is turned ON (LL="1"), i.e., whether the engine is in an idling state or in a non-idling state. As a result, only when the engine is in an idling state does the control proceed to step 815, which measures a rich state duration by counting up a counter value CNTR by t1.

Note, when the engine is in a non-idling state (LL="0"), the control proceeds via steps 830 and 831 to step 832.

Also, at step 816, it is determined whether or not the idle switch of the throttle sensor 16 is turned ON (LL="1"), i.e., whether the engine is in an idling state or in a non-idling state. As a result, only when the engine is in an idling state does the control proceed to step 817, which calculates a repetition period T of the output $V_{OX}$ of the $O_2$ sensor 14 by

T←CNTL+CNTR

Then, at step 818, the counter value CNTL is cleared, and the control proceeds to step 822. Similarly, at step 819, it is determined whether or not the idle switch of the throttle sensor 16 is turned ON (LL = "1"), i.e., whether the engine is in an idling state or in a non-idling state. As a result, only when the engine is in an idling state does the control proceed to step 820, which calculates a repetition period T of the output $V_{OX}$ of the $O_2$ sensor 14 by

T←CNTR+CNTL

Then, at step 821, the counter value CNTR is cleared, and the control proceeds to step 822.

At step 822, since the output $V_{OX}$ of the $O_2$ sensor 14 is inverted in an idling state, which means that a purge of the $O_2$ sensor 14 is completed, an on-purge flag XP is reset. Note, after the flag XP is reset, the flag XP is not set again in an idling state.

Steps 823 to 829 are explained below.

At step 823, the repetition period T of the $O_2$ sensor 14 calculated at step 817 or 820 is compared with a predetermined time $T_1$. As a result, if $T < T_1$, the control proceeds to steps 824 to 827 which prohibit the renewal of the idling coarse-adjusting term $AF_{cl}$, while if $T \geq T_1$, the control proceeds to steps 828 and 829 at which the idling coarse-adjusting term $AF_{cl}$ is renewed. That is, at step 824, it is determined whether or not the renewal flag XT1 is "0". Only when XT1 = "0" does the control proceed to step 825, which holds the idling coarse-adjusting term at an intermediate value between maximum and minimum values of the idling coarse-adjusting term $AF_{cl}$ immediately before the calculation of the idling coarse-adjusting term $AF_{cl}$ is prohibited. That is, $$AF_{cl} \leftarrow (AF_{clmax} + AF_{clmin})/2$$

Then, at step 826, the flag XT1 is set (XT1 = "1"), thus carrying out step 825 only one time when $T < T_1$. Thus, thereafter, the idling coarse-adjusting term $AF_{cl}$ is held at such an intermediate value. Next, at step 827, the counter value CNTF for the integration speed of the idling coarse-adjusting term $AF_{cl}$ is cleared. On the other hand, if $T \geq T_1$ at step 823, the control proceeds to step 828 which resets the renewal/prohibit flag XT1 (XT1 = "0"), thus enabling the renewal of the idling coarse-adjusting term $AF_{cl}$. Also, at step 829, the counter value CNTF is set at a predetermined value such as 8. That is, every time the output $V_{OX}$ of the $O_2$ sensor 14 is inverted, the counter value CNTF is set at a 8, and accordingly the integration speed of the idling coarse-adjusting term $AF_{cl}$ is made large for a time defined by $8 \times 512$ ms, which will be later explained with reference to FIG. 11.

Then, the routine of FIG. 8 is completed by step 832.

Figure 10A:
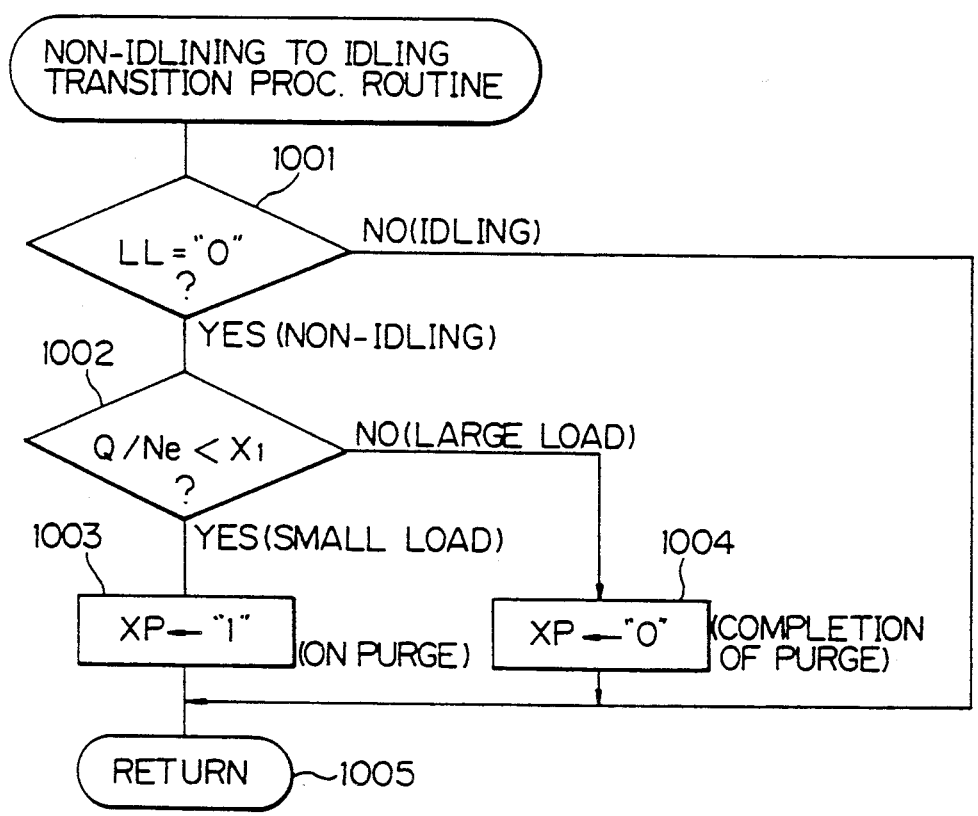

FIG. 10A is a routine for processing a transition from a non-idling state to an idling state, executed at a predetermined interval such as 64 ms. This routine estimates a purge time (response) of the $O_2$ sensor 14 by an intake air amount state immediately before the idling state. When this estimated purge time is small, it is considered that a purging of the $O_2$ sensor 14 is completed and the flag XP is reset (XP = "0"), thus initiating the renewal of the idling coarse-adjusting term $AF_{cl}$ with a large integration speed immediately after the engine enters an idling state. Conversely, when this estimated purge time is large, it is considered that a purging of the $O_2$ sensor 14 is in progress and the flag XP is set (XP = "1"), thus initiating the renewal of the idling coarse-adjusting term $AF_{cl}$ with a small integration speed immediately after the engine enters an idling state.

At step 1001, it is determined whether the engine is in a non-idling state (LL = "0") or in an idling state. As a result, when LL = "0", the control proceeds to steps 1002 to 1004. Otherwise, the control proceeds directly to step 1005.

At step 1002, the intake air amount data Q and the engine speed data $N_e$ are read out of the RAM 105, it is determined whether or not $Q < N_e \leq = X_1$ (definite) is satisfied. As a result, if $Q/N_e < X_1$, the control proceeds to step 1003 which sets the on-purge flag XP (XP = "1"), but if $Q/N_e \leq X_1$, the control proceeds to step 1004 which resets the on-purge flag XP (XP = "0"). Then, this routine is completed by step 1005.

Thus, after the engine is switched from a nonidling state such as a small load state to an idling state, the on-purge flag XP set or reset at step 1003 or 1004 is maintained. The set on-purge flag XP (= "1") is maintained until the output $V_{OX}$ of the $O_2$ sensor 14 is inverted at step 822 of FIG. 8, as explained above.

Figure 10B:
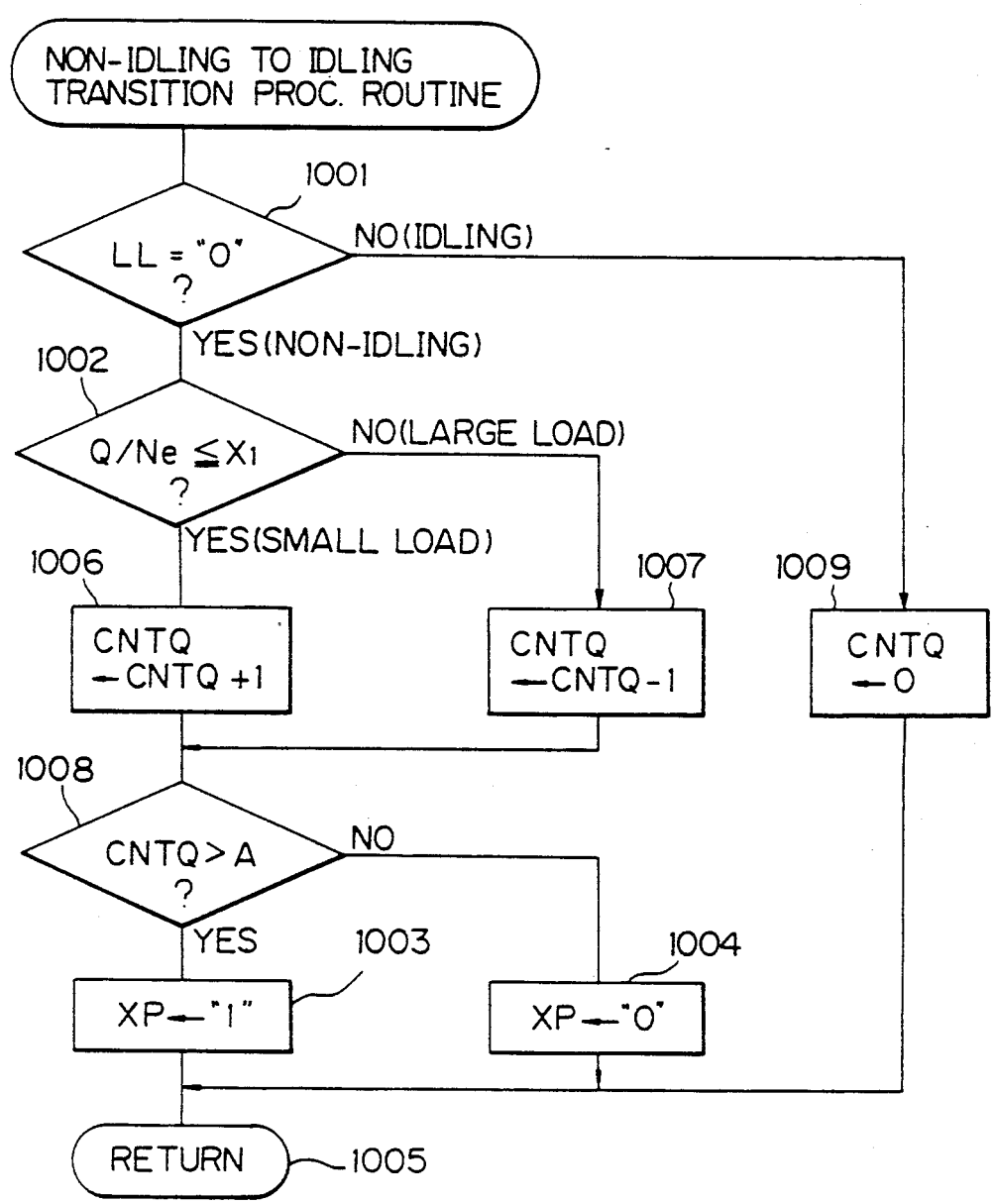

FIG. 10B, which is a modification of FIG. 10A, steps 1006 to 1009 are added to the routine of FIG. 10A. That is, a counter value CNTQ indicating a purge time of the $O_2$ sensor 14 is introduced. As a result, if the engine is in a small load state ($Q/N_e \geq X_1$), the control proceeds to step 1006 which counts up the counter value CNTQ by +1, but if the engine is in a large load state ($Q/N_e > X_1$), the control proceeds to step 1007 which counts down the counter value CNTQ. Then, at step 1008, it is determined whether or not CNTQ > A (definite) is satisfied, i.e., whether the estimated purge time is larger than a predetermined time. As a result, when the estimated purge time is large (CNTQ > A), the control proceeds to step 1003 which sets the on-purge flag XP (XP = "1"), but if the estimated purge time is small (CNTQ ≤ A), the control proceeds to step 1004 which resets the on-purge flag XP (XP = "0").

Note, if the engine is in an idling state, the counter value CNTQ is cleared at step 1009.

According to the routine of FIG. 10B, the on-purge flag XP is set or reset in accordance with a degree defined by CNTQ of the small load state to the large load state.

Figure 11C:
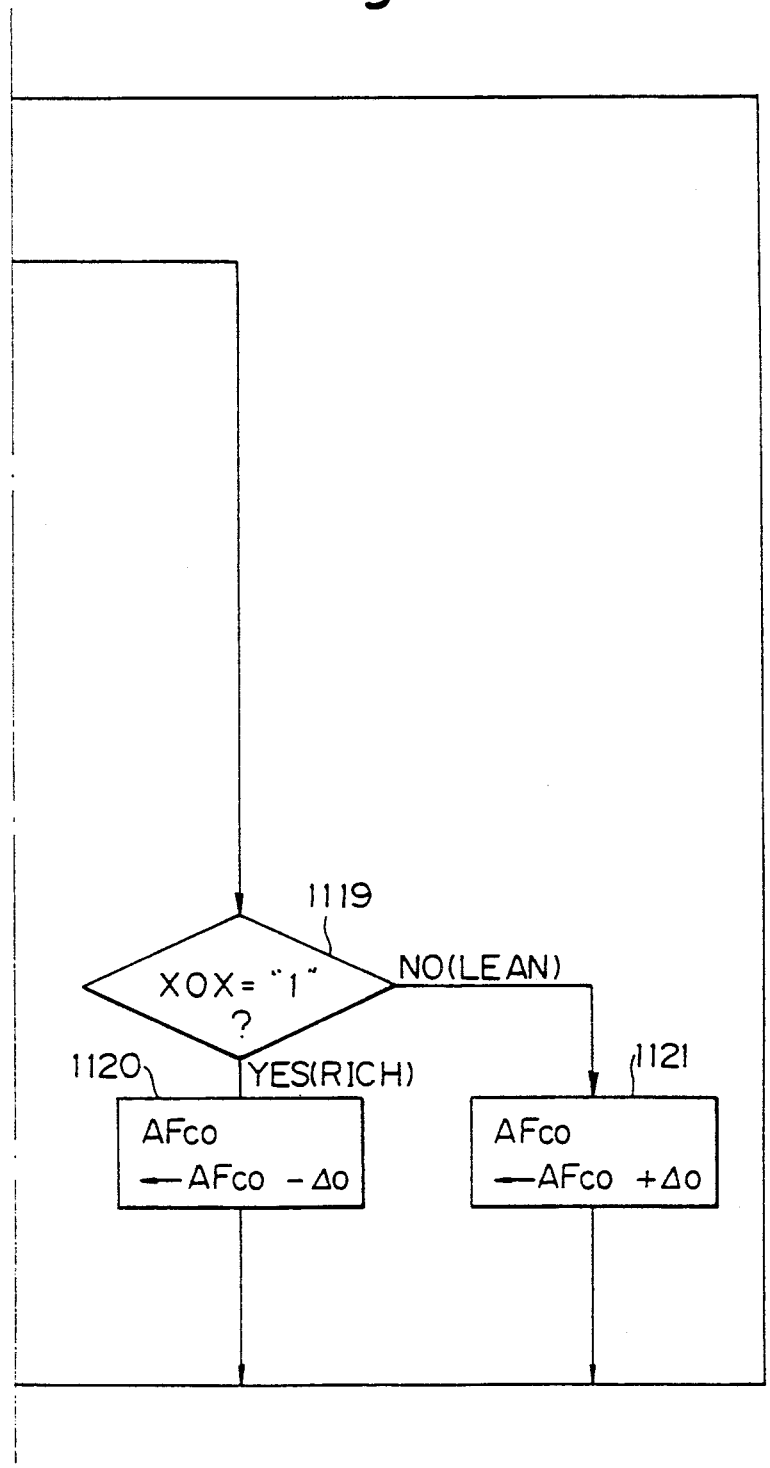

FIG. 11 is a routine for calculating coarse-adjusting terms $AF_{c0}$ and $AF_{cl}$, executed at a predetermined internal such as 64 ms. Here, $AF_{cl}$ is the idling coarse-adjusting term, as explained above, while $AF_{c0}$ is a non-idling coarse-adjusting term. Steps 1306 to 1113 are used for calculating the idling coarse-adjusting term $AF_{cl}$ at a large integration speed, steps 1114 to 1118 are used for calculating the idling coarse-adjusting term $AF_{cl}$ at a small integration speed, and steps 1119 to 1121 are used for calculating the non-idling coarse-adjusting term $AF_{c0}$.

Figure 13B:
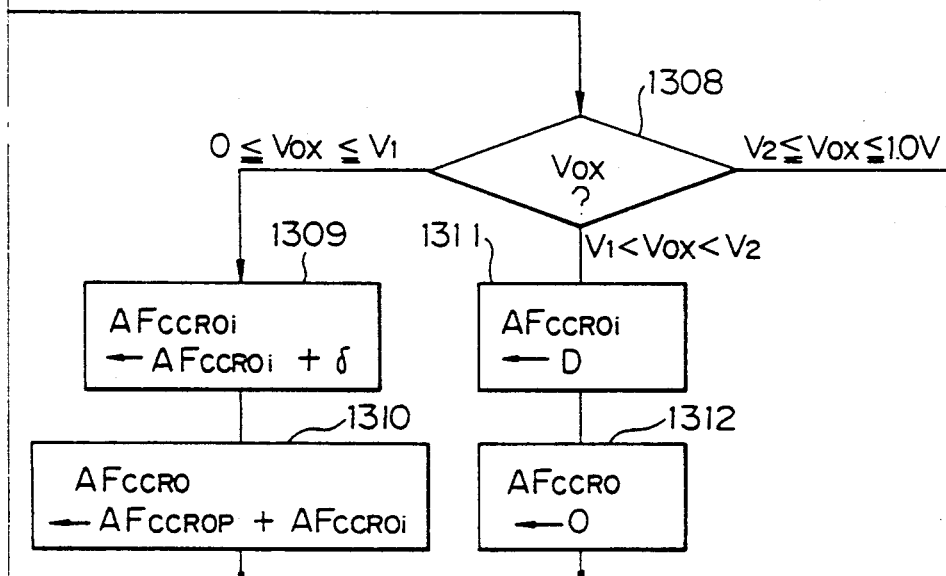
Figure 13C:
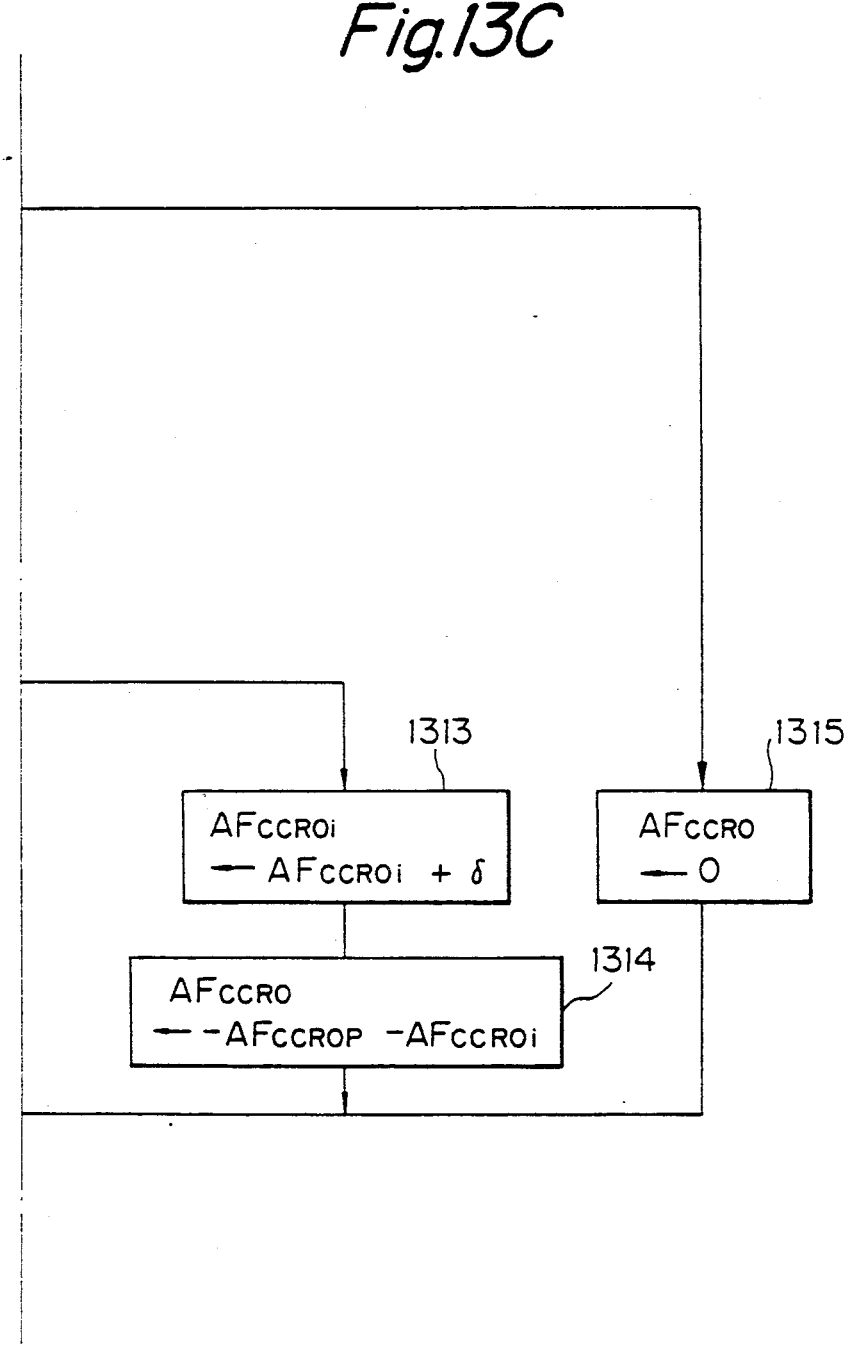

At step 1101, it is determined whether or not all of the feedback control conditions are satisfied, as at step 1301 of FIG. 13. As a result, when one or more of the feedback control conditions are not satisfied, the control proceeds directly to step 1122. When all of the feedback control conditions are satisfied, the control proceeds to step 1102.

At step 1102, it is determined whether or not the idle switch of the throttle sensor 16 is turned ON (LL = "1"), i.e., whether or not the engine is in an idling state (LL = "1") or in a non-idling state (LL = "0"). As a result, when the engine is in an idling state, the control proceeds to step 1103, but when the engine is in a non-idling state, the control proceeds to step 1119.

At step 1103, it is determined whether or not XT1="0" is satisfied, i.e., whether the calculation of the idling coarse-adjusting term $AF_{cl}$ is to be carried out (XT1="0") or to be prohibited (XT1≠"0"). Note that the renewal/prohibition flag XT1 is cleared when the repetition time T is longer than $T_1$ (T≧$T_1$) as explained above. As a result, only if the renewal/prohibition flag $XT_1$ is "0" does the control proceed to step 1304. Otherwise, the control proceeds to step 1122.

At step 1304, it is determined whether the on-purge flag XP is "0" (completion of purge) or "1" (on purge). As a result, if XP="1", the control proceeds to steps 1114 to 1118 which calculates the idling coarse-adjusting term $AF_{cl}$ at the small integration speed $\Delta_2$. Otherwise (XP="0"), the control proceeds to step 1105.

At step 1105, it is determined whether or not the calculation of the idling coarse-adjusting term $AF_{cl}$ is to be carried out at the large integration speed (CNTF≠0) or at the small integration state (CNTF). As a result, if at the large integration speed state ($\Delta_{1L}$, $\Delta_{1R}$), the control proceeds to steps 1306 to 1113, but if at the small integration state ($\Delta_2$), the control proceeds to steps 1114 to 1118.

Steps 1306 to 1118 are explained below.

At step 1306, the counter value CNTF is counted down by 1, and the counter value CNTF is guarded by 0 to steps 1107 and 1108. That is steps 1109 to 1113 are carried out for a predetermined time corresponding to CNTF=8, i.e., 64 ms×8. At step 1109, it is determined whether or not XOX="0", i.e., whether the current air-fuel ratio downstream of the catalyst converter 12 is rich ("1") or lean ("0"). As a result, if rich ("0"), the control proceeds to step 1110 which decreases the idling coarse-adjusting term $AF_{cl}$ by $\Delta_{1L}$ (definite), and at step 1111, the minimum value $AF_{clmin}$ is renewed by $AF_{cl}$. On the other hand, if lean ("0"), the control proceeds to step 1112 which increases the idling coarse-adjusting term $AF_{cl}$ by $\Delta_{1R}$, and at step 1113, the maximum value $AF_{clmax}$ is renewed by $AF_{cl}$.

Here, the values $\Delta_{1L}$ and $\Delta_{1R}$ satisfy the following:

$$\Delta_{1L} > \Delta_{1R}$$

That is, the integration speed $\Delta_{1L}$, where the output $V_{OX}$ of the $O_2$ sensor 14 indicates a rich state, is larger than the integration speed $\Delta_{1R}$, where the output $V_{OX}$ of the $O_2$ sensor 14 indicates a lean state, thus compensating for the asymmetry of the output $V_{OX}$ of the $O_2$ sensor 14. Then, the control proceeds to step 1122. Note that the minimum value $AF_{clmin}$ and the maximum value $AF_{clmax}$ are used in the calculation of the hold value of the idling coarse-adjusting term $AF_{cl}$ carried out at step 825 of FIG. 8.

Steps 1114 to 1118 are explained below.

At step 1114, it is determined whether or not XOX="0", i.e., whether the current air-fuel ratio downstream of the catalyst converter 12 is rich ("1") or lean ("0"). As a result, if rich ("0"), the control proceeds to step 1115 which decreases the idling coarse-adjusting term $AF_{cl}$ by $\Delta_2$ (definite) and at step 1116, the minimum value $AF_{clmin}$ is renewed by $AF_{cl}$. On the other hand, if lean ("0"), the control proceeds to step 1117 which increases the idling coarse-adjusting term $AF_{cl}$ by $\Delta_2$, and at step 1118, the maximum value $AF_{clmax}$ is renewed by $AF_{cl}$.

Here, the values $\Delta_{1L}$ and $\Delta_{1R}$, $\Delta_2$ satisfy the following:

$$\Delta_{1L} > \Delta_{1R} > \Delta_2$$

Thus, at steps 1110 and 1112, and at steps 1115 and 1117, the integration speed of the idling coarse-adjusting term $AF_{cl}$ is switched at $\Delta_{1L}$ ($\Delta_{1R}$) and $\Delta_2$, thus creating the difference in the integration speed.

Steps 1119 to 1121 are explained below.

At step 1119, it is determined whether or not XOX="1", i.e., whether the current air-fuel ratio downstream of the catalyst converter 12 is rich ("1") or lean ("0"). As a result, if rich ("1"), the control proceeds to step 1120 which decreases the non-idling coarse-adjusting term $AF_{c0}$ by $\Delta_0$ (definite), and if lean ("0"), the control proceeds to step 1121 which increases the non-idling coarse-adjusting term $AF_{c0}$ by $\Delta_0$.

Here, the values $\Delta_{1L}$ and $\Delta_{1R}$, $\Delta_2$, $\Delta_0$ satisfy the following:

$$\Delta_{1L} > \Delta_{1R} > \Delta_0 > \Delta_2$$

Note that all of the values $\Delta_0$, $\Delta_{1L}$, $\Delta_{1R}$, and $\Delta_2$ are smaller than the skip amount $\Delta AF_f$ used at steps 807 and 811.

Therefore, when the air-fuel ratio downstream of the catalyst converter 12 is lean (XOX="0"), the coarse-adjusting terms $AF_{c0}$ and $AF_{cl}$ are gradually increased, and when the air-fuel ratio downstream of the catalyst converter 12 is rich (XOX="1"), the coarse-adjusting term $AF_{c0}$ and $AF_{cl}$ are gradually decreased. Thus, the control of the coarse-adjusting terms $AF_{c0}$ and $AF_{cl}$ corresponds to an integral control. Particularly, as shown in FIGS. 12A and 12B, the integration speed of the idling coarse-adjusting terms $AF_{c0}$ and $AF_1$ is made large for a predetermined time (CNTF=8) after the inversion of the air-fuel ratio flag XOX including the case where the purge time of the $O_2$ sensor 14 is large even after the engine enters an idling state. In addition, the integration speed $\Delta_{1L}$ (FIG. 12A) where XOX="1" (rich) is larger than the integration speed $\Delta_{1R}$ (FIG. 12B) where XOX="0" (lean).

In FIG. 13, which is a routine for calculating an $O_2$ storage term $AF_{CCRO}$ executed at a predetermined time such as 16 ms, at step 1301, it is determined whether or not all of the air-fuel ratio feedback control conditions are satisfied, in the same way as at step 801 of FIG. 8. As a result, when one or more of the air-fuel ratio feedback conditions are not satisfied, the control proceeds to step 1315 which causes the $O_2$ storage term $AF_{CCRO}$ to be 0, and if all of the air-fuel ratio feedback conditions are satisfied, the control proceeds to step 1302. At step 1302, the output $V_{OX}$ of the $O_2$ sensor 14 is fetched, and an A/D conversion is performed upon the output $V_{OX}$. At step 1303, it is determined whether the engine is in an idling state (LL="1") or in a non-idling state (LL="0"), thus switching the flow of steps 1304 to 1307 and the flow of steps 1308 to 1314. That is, the amplitude of the $O_2$ storage term $AF_{CCRO}$ is smaller in an idling state than in a non-idling state, thus suppressing the fluctuation of the air-fuel ratio.

Steps 1304 to 1307 are explained below.

At step 1304, the output $V_{OX}$ of the $O_2$ sensor 14 is determined. Here, the output $V_{OX}$ of the $O_2$ sensor 14 is divided into three regions:

$$0 - V_1$$

$$V_1 - V_2$$

$$V_2 - 1.0 \text{ V}$$

Therefore, at step 1304, it is determined to what region the output $V_{OX}$ of the $O_2$ sensor 14 belongs, and as a result, if $0 \leq V_{OX} \leq V_1$, the control proceeds to step 1305 which calculates the $O_2$ storage term $AF_{CCRO}$ by $$AF_{CCRO} \leftarrow AF_{CCROP} \text{ (definite value)}$$

If $V_1 < V_{OX} < V_2$, and the control proceeds to step 1306 which calculates the $O_2$ storage term $AF_{CCRO}$ by $$AF_{CCRO} \leftarrow 0$$

If $V_2 \leq V_{OX} \leq 1.0$ V, the control proceeds to step 1307 which calculates the $O_2$ storage term $AF_{CCRO}$ by $$AF_{CCRO} \leftarrow -AF_{CCROP}$$

That is, the $O_2$ storage term $AF_{CCRO}$ is skipped by the amount $AF_{CCROP}$ by steps 1304 to 1307.

Steps 1308 to 1314 are explained below.

At step 1308, the output $V_{OX}$ of the $O_2$ sensor 14 is determined. Here, the output $V_{OX}$ of the $O_2$ sensor 14 is also divided into three regions:

$$0 - V_1$$

$$V_1 - V_2$$

$$V_2 - 1.0 \text{ V}$$

Therefore, at step 1308, it is determined to what region the output $V_{OX}$ of the $O_2$ sensor 14 belongs, and as a result, if $0 \leq VO_X \leq V_1$, the control proceeds to step 1309 which calculates the integration term $AF_{CCROi}$ of the $O_2$ storage term $AF_{CCOR}$ by $$AF_{CCROi} \leftarrow AF_{CCRoi} + \delta \text{ (definite value)}$$

Then, at step 1310, the $O_2$ storage term $AF_{CCRO}$ is calculated by $$AF_{CCRO} \leftarrow AF_{CCROP} + AF_{CCROi}$$

If $V_1 < V_{OX} < V_2$, the control proceeds to step 1311 which calculates the integration term $AF_{CCROi}$ of the $O_2$ storage term $AF_{CCRO}$ by $$AF_{CCROi} \leftarrow 0$$

Then, at step 1312, the $O_2$ storage term $AF_{CCRO}$ is calculated by $$AF_{CCRO} \leftarrow 0$$

If $V_2 \leq V_{OX} \leq 1.0$ V, the control proceeds to step 1313 which calculates the integration term $AF_{CCROi}$ of the $O_2$ storage term $AF_{CCRO}$ by $$AF_{CCROi} \leftarrow -AF_{CCROi} + \delta$$

Then, at step 1314, the $O_2$ storage term $AF_{CCRO}$ is calculated by $$AF_{CCRO} \leftarrow -AF_{CCROP} - AF_{CCROi}$$

That is, the $O_2$ storage term $AF_{CCRO}$ is skipped by the amount $AF_{CCROP}$ and is gradually changed by the integration term $AF_{CCROi}$ by steps 1308 to 1314.

Then, this routine is completed by step 1316.

Thus, since the $O_2$ sensor 14 is located downstream of the catalyst converter 14, the $O_2$ storage amount of the catalyst converter 12 can be monitored by the output $V_{OX}$ of the $O_2$ sensor 14. Therefore, the $O_2$ storage amount is calculated in accordance with this $O_2$ storage amount. In this case, since a duration for which the output $V_{OX}$ of the $O_2$ sensor 14 belongs to the same region affects the $O_2$ storage amount of the catalyst converter 12, the integration amount is introduced into the $O_2$ storage amount $AF_{CCRO}$.

Note that the number of regions of the output $V_{OX}$ of the $O_2$ sensor 14 can be more than 3.

Also, at steps 1305 and 1307, the $O_2$ storage term $AF_{CCRO}$ can be $AF_{CCROP}$ and $-AF_{CCROP}$ ($AF_{CROP} < AF_{CCROP}$), respectively, thus compensating for the tendency to the rich side due to the reduction of the element temperature of the $O_2$ sensor 14.

Figure 14B:
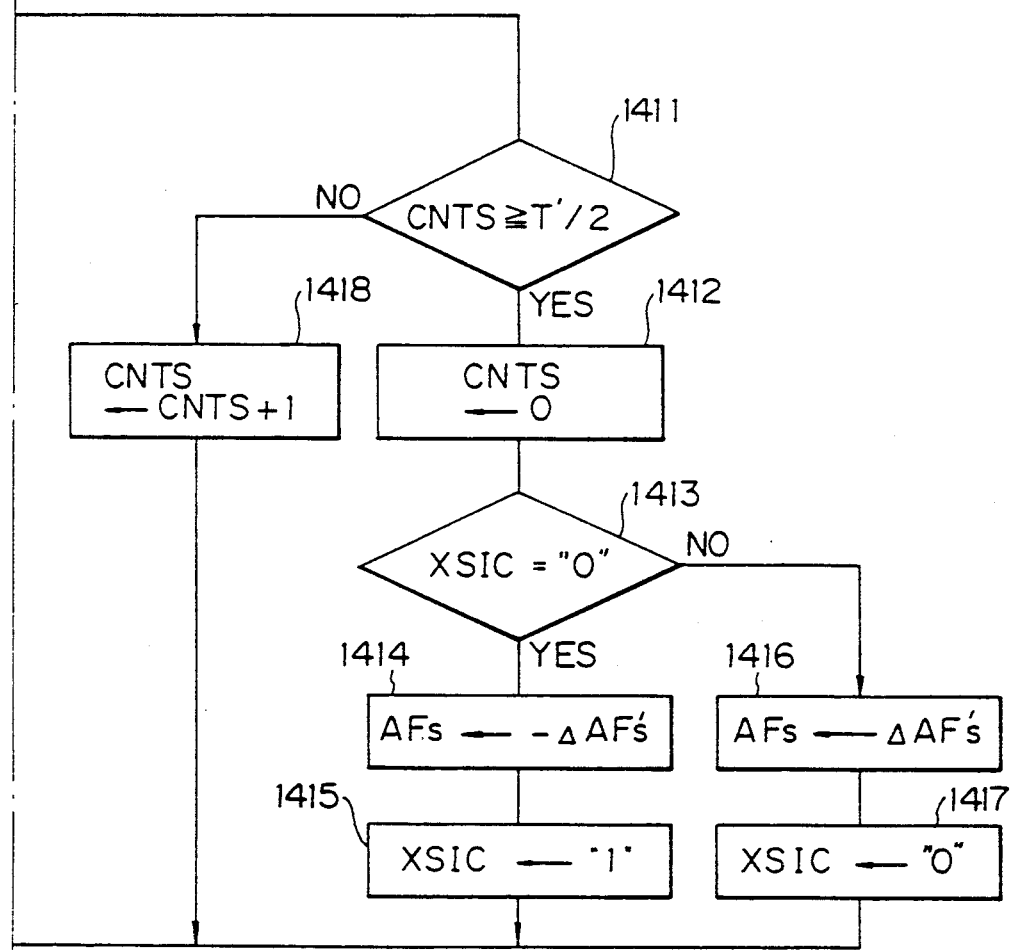

In FIG. 14, which is a routine for calculating a self-oscillating term $AF_s$ executed at a time such as 4 ms, at step 1401 it is determined whether or not all of the air-fuel ratio feedback conditions are satisfied in the same way as at step 801 of FIG. 8. As a result, when one or more of the air-fuel ratio feedback conditions are not satisfied, the control proceeds directly to step 1419, and if all of the air-fuel ratio feedback conditions are satisfied, the control proceeds to step 1402. At step 1402, it is determined whether the engine is in an idling state (LL="1") or in a non-idling state (LL="0"). As a result, if in an idling state, the control proceeds to step 1403 to 1410, but if in a non-idling state, the control proceeds to steps 1411 to 1418.

That is, in an idling state, at step 1403, it is determined whether or not a counter value CNTS has reached T/2, where T is a period of the self-oscillating term $AF_s$. That is, since the counter value CNTS is counted up by $+1$ at step 1410, the control at step 1403 proceeds to steps 1404 to 1409 at every time T/2. At step 1404, the counter value CNTS is cleared, and then at step 1405, it is determined whether or not a self-oscillating flag XSIC is "0". As a result, when XSIC="0", the control proceeds to step 1406 which causes the self-oscillating term $AF_s$ to be $-\Delta AF_s$ (definite value), thus inverting the self-oscillating flag XSIC at step 1407. As a result, the counter value CNTS again reaches T/2 and the control at step 1405 proceeds to step 1408, which causes the self-oscillating term $AF_s$ to be $\Delta AF_s$, thus inverting the self-oscillating flag XSIC at step 1409.

On the other hand, in a non-idling state, the flow of steps 1411 to 1418 generates a self-oscillating term $AF_s$. In this case, steps 1411 to 1418 correspond to step 1403 to 1410, respectively. In this non-idling state, there is generated a self-oscillating term $AF_s$ having a definite amplitude $\Delta AF_s'$ larger than the amplitude $\Delta AF_s$ and a period T' smaller than the period T in an idling state. That is, as shown in FIGS. 15A and 15B, in an idling state, the amplitude of the self-oscillating term $AF_s$ is decreased and the period T thereof is increased, to reduce the fluctuation of the controlled air-fuel ratio.

Figure 16:
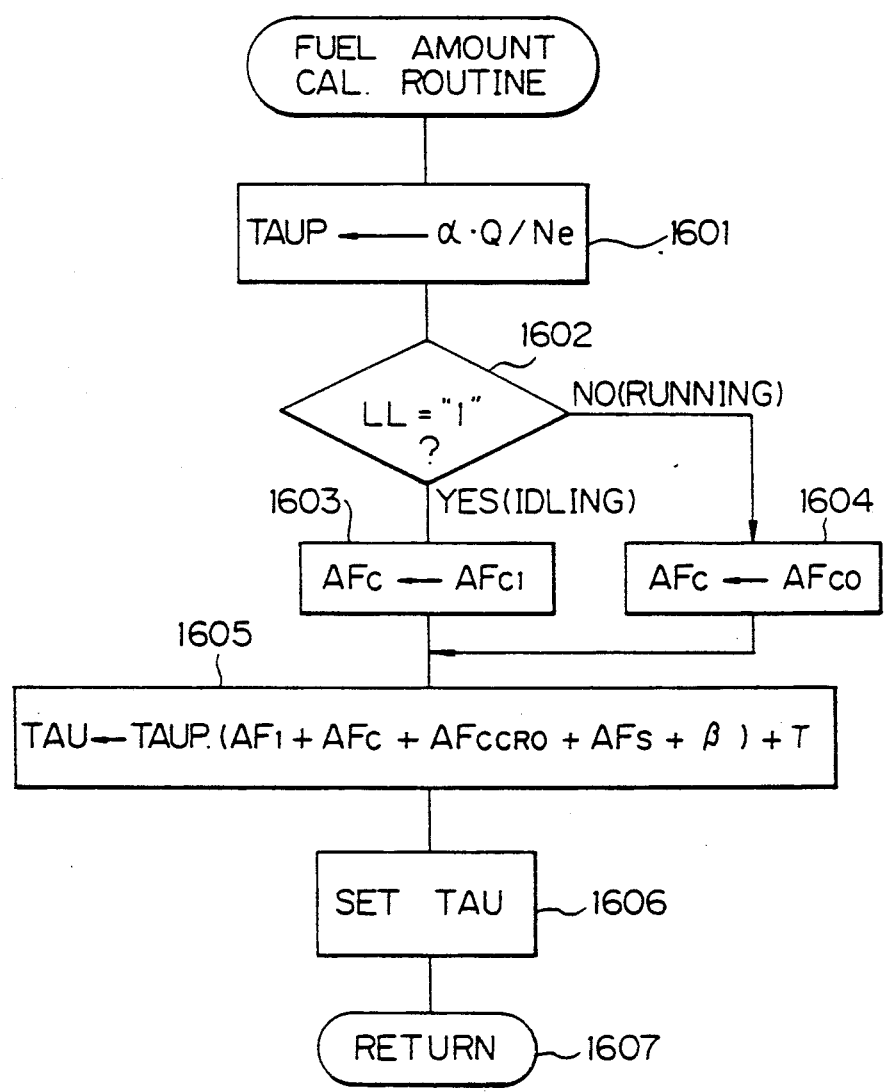

FIG. 16 is a routine for calculating a fuel injection amount TAU executed at a predetermined crank angle such as 360° CA.

At step 1601, a base fuel injection amount TAUP is calculated by using the intake air amount data Q and the engine speed data $N_e$ stored in the RAM 105. That is TAUP←α·Q/$N_e$ where α is a constant. At step 1602, it is determined whether the engine is in an idling state (LL="1") or in a non-idling state (LL="0"). As a result, if in an idling state, the control proceeds to step 1603 which causes the coarse-adjusting term $AF_c$ to be the idling coarse-adjusting term $AF_{c1}$, but in a non-idling state, the control proceeds to step 1604 which causes the coarse-adjusting term $AF_c$ to be the non-idling coarse-adjusting term $AF_{c0}$. At step 1605, a final fuel injection amount TAU is calculated by TAU←TAUP·($AF_f$+$AF_c$+$AF_{CCRO}$+$AF_s$+β)+γ where β and γ are correction factors determined by other parameters such as the voltage of the battery and the temperature of the intake air. At step 1606, the final fuel injection amount TAU is set in the down counter 107, and in addition, the flip-flop 109 is set to initiate the activation of the fuel injection valve 7. This routine is completed by step 1607. Note that, as explained above, when a time corresponding to the amount TAU has passed, the flip-flop 109 is reset by the borrow-out signal of the down counter 108 to stop the activation of the fuel injection valve 7.

Figure 17A:
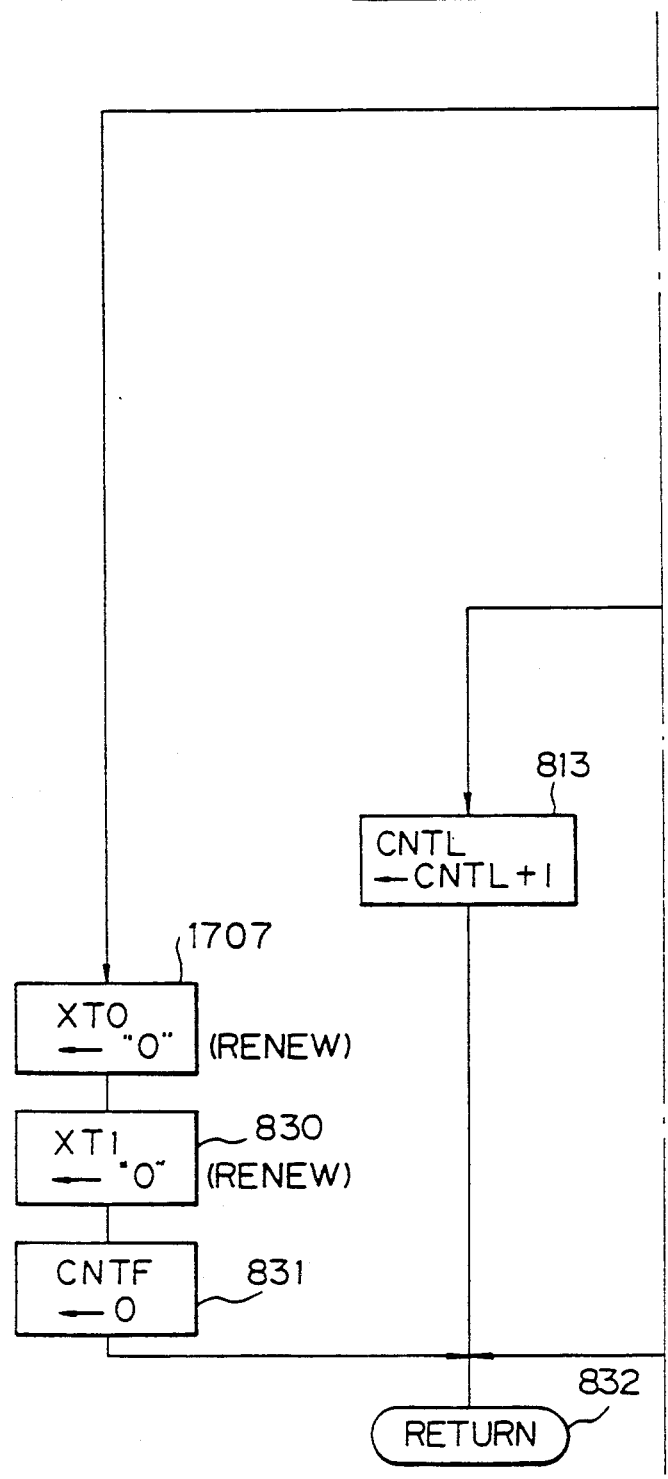
Figure 17B:
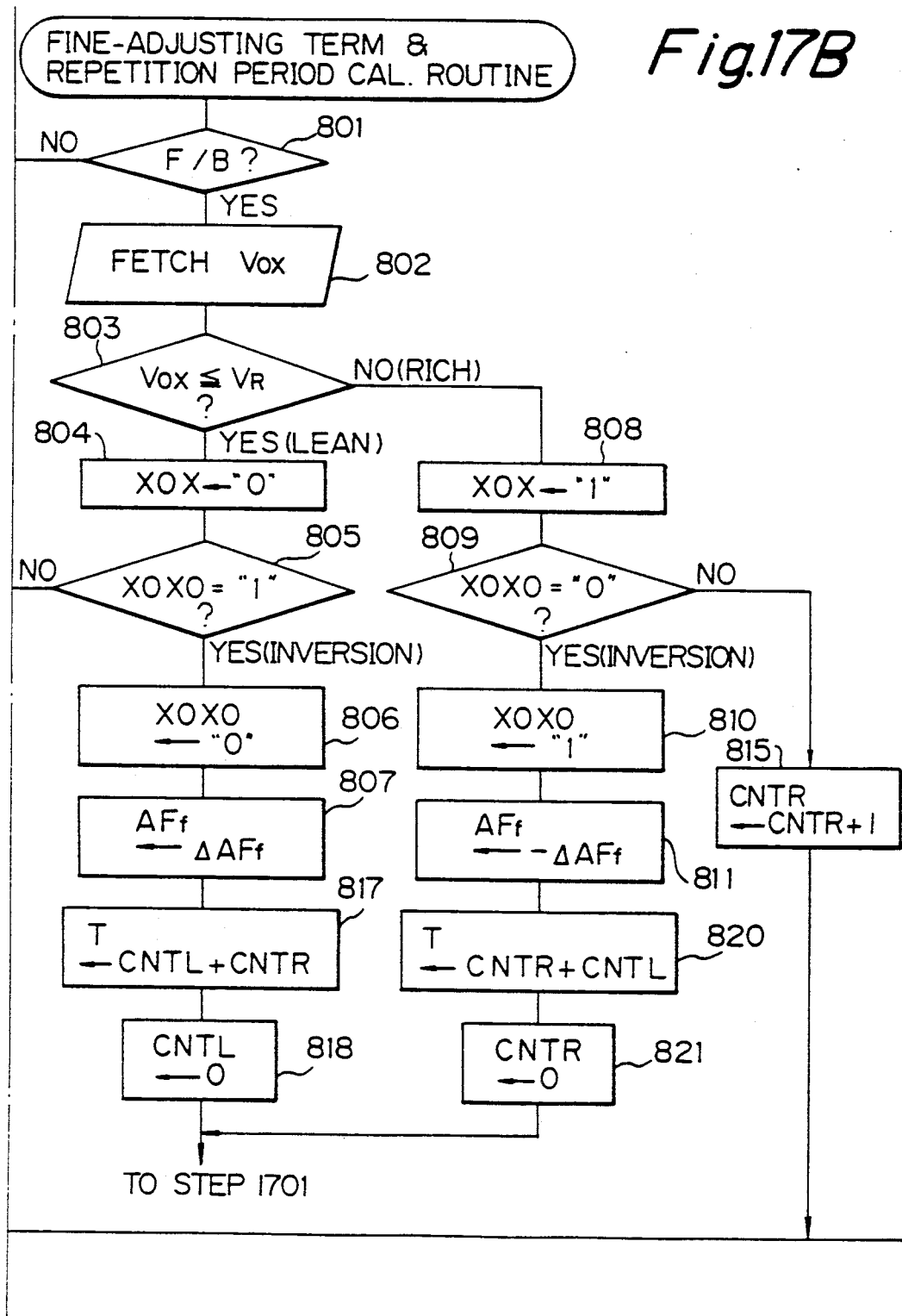
Figure 17D:
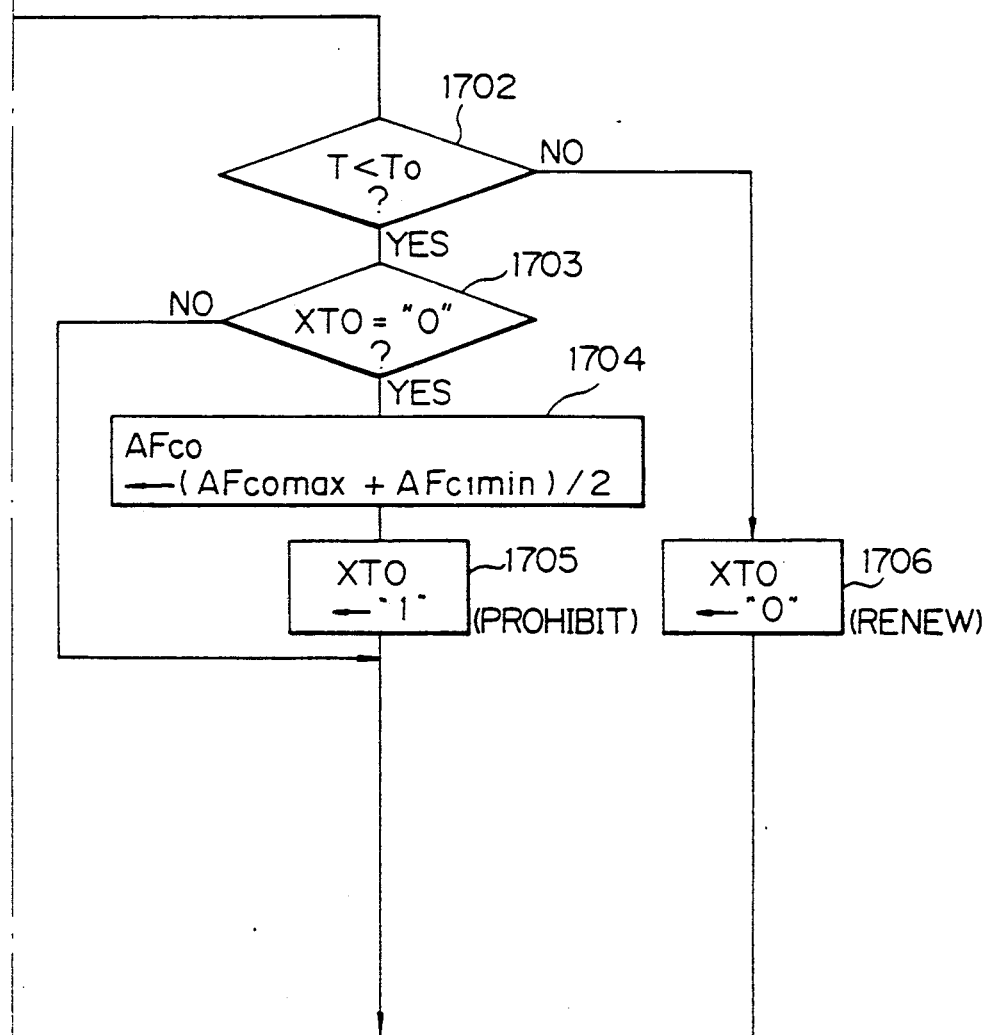
Figure 18:
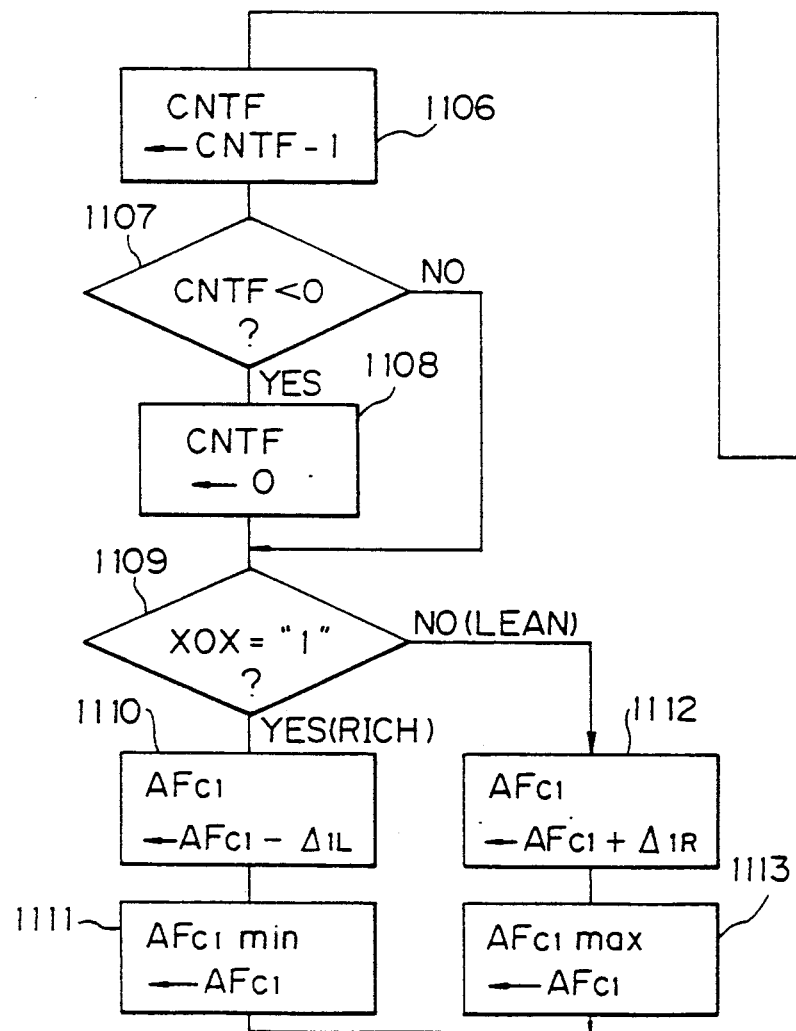
Figure 18B:
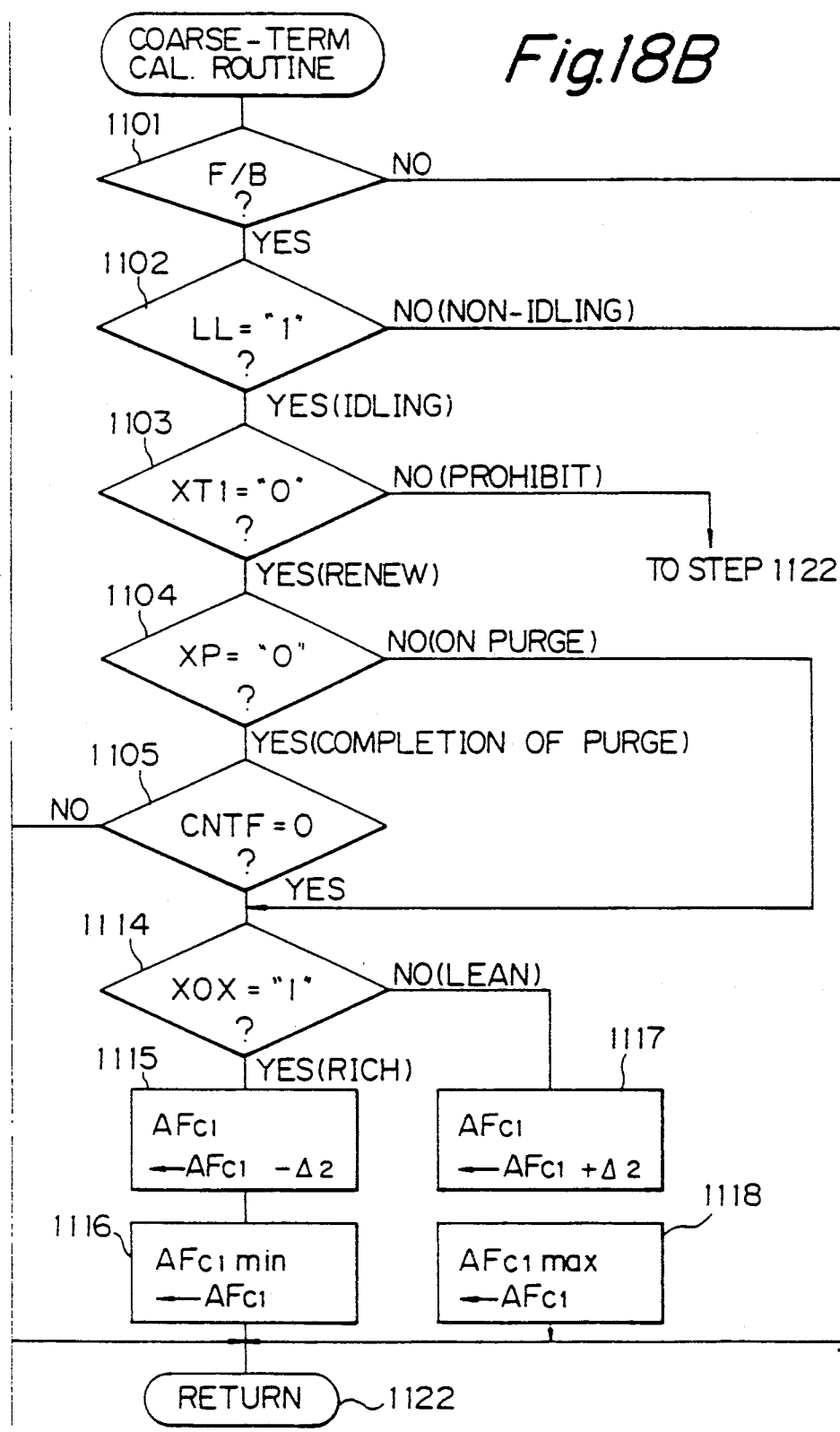
Figure 18C:
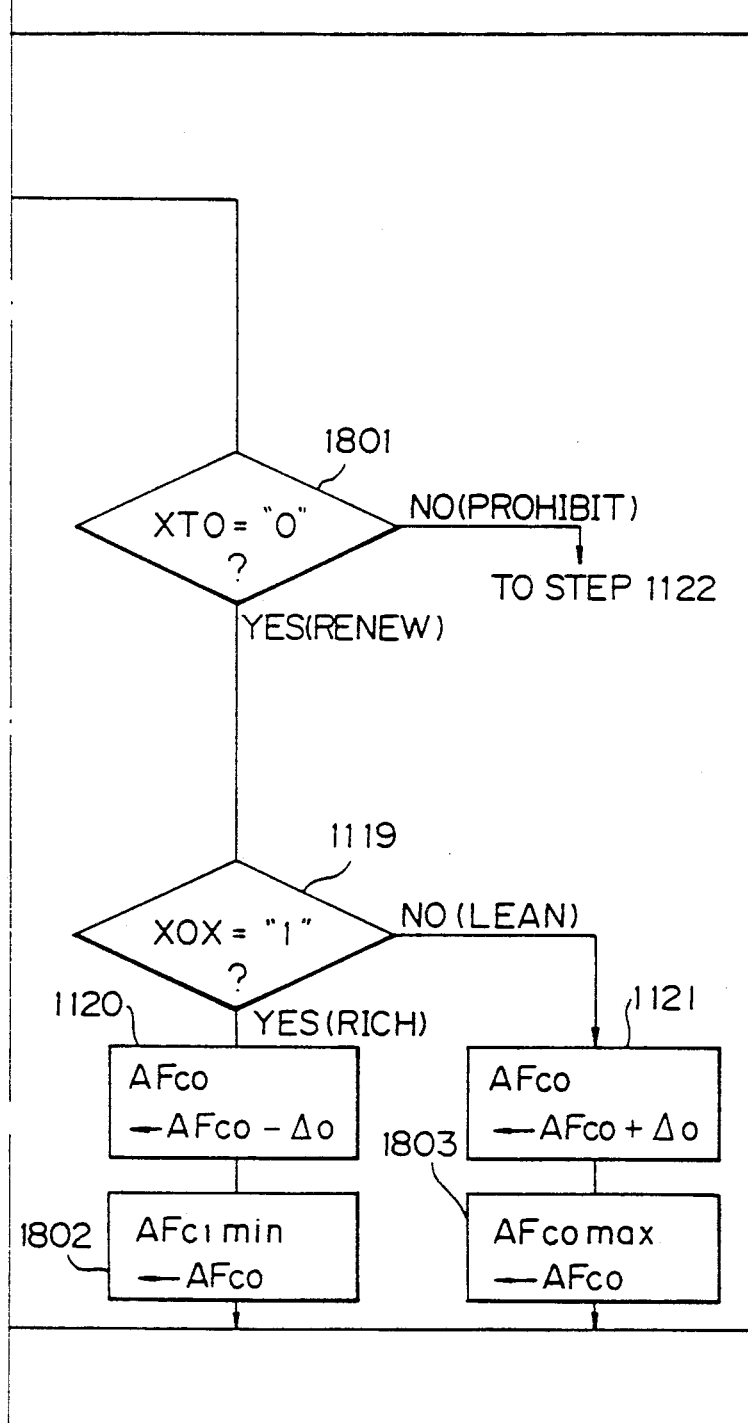

FIGS. 17 and 18 are modifications of FIGS. 8 and 11, respectively. That is, FIGS. 17 and 18, in the same way that the idling coarse-adjusting term $AF_{c1}$, is prohibited the calculation of the non-idling coarse-adjusting term $AF_{c0}$ is also prohibited, when the repetition period T of the output $V_{OX}$ of the $O_2$ sensor 14 is smaller than a predetermined period $T_0$, thereby avoiding the fluctuation of the controlled air-fuel ratio in a non-idling state.

In FIG. 17, steps 812, 814, 816, and 819 are detected, to calculate a repetition period T even in a non-idling state. Also, a renewal/prohibition flag XT0 of the non-idling coarse-adjusting term $AF_{c0}$ is introduced, and steps 1701 to 1707 are added. That is, when one or more of the air-fuel ratio feedback conditions are not satisfied at step 801, the renewal/prohibition flag XT1 is reset (XT1="0") at step 1707.

Also, when all the air-fuel feedback conditions are satisfied at step 801, the repetition period T of the output $V_{OX}$ of the $O_2$ sensor 14 is calculated both in an idling state and in a non-idling state, and then the control proceeds to step 1701. As a result, when the engine is in an idling state (LL="1"), steps 823 to 829 are carried out in the same way as in FIG. 8. On the other hand, when the engine is in a non-idling state (LL="0"), the control proceeds to steps 1702 to 1706.

Steps 1702 to 1706 correspond to steps 823 to 826, and 828. At step 1702, the repetition period T of the $O_2$ sensor 14 calculated at step 817 or 820 is compared with the predetermined period $T_0$. As a result, if T<$T_0$, the control proceeds to steps 1703 to 1705 which prohibits the renewal of the non-idling coarse-adjusting term $AF_{c0}$, while if T≧$T_0$, the control proceeds to step 1706 which causes the non-idling coarse-adjusting term $AF_{c0}$ to be renewed. That is, at step 1703, it is determined whether or not the renewal/prohibition flag XT0 is "0". Only when XT0="0" does the control proceed to step 1704, which holds the non-idling coarse-adjusting term $AF_{c0}$ at an intermediate value between maximum and minimum values of the non-idling coarse-adjusting term $AF_{c0}$ immediately before the calculation of the non-idling coarse-adjusting term $AF_{c0}$ is prohibited. That is, $AF_{c0}$←($AF_{c0max}$+$AF_{c0min}$)/2

Then, at step 1705, the flag XT0 is set (XT0="1"), thus carrying out step 825 only one time when T<$T_0$. Thus, thereafter, the non-idling coarse-adjusting term $AF_{c0}$ is held at such an intermediate value. On the other hand, if T≧$T_0$ at step 1702, the control proceeds to step 1706 which resets the renewal/prohibit flag XT0 (XT0="0"), thus enabling the renewal of the non-idling coarse-adjusting term $AF_{c0}$.

In FIG. 18, steps 1801 to 1803 are added to the routine of FIG. 11. That is, at step 1801, it is determined whether the renewal/prohibition flag XT0 calculated by the routine of FIG. 17 is "0" or "1". As a result, if the flag XT0 is "1", the control proceeds directly to step 1122, thereby prohibiting the calculation of the non-idling coarse-adjusting term $AF_{c0}$. Otherwise, the control proceeds to steps 1119 to 1121, 1802, and 1803. That is, at step 1119, it is determined whether or not XOX="1", i.e., whether the current air-fuel ratio downstream of the catalyst converter 12 is rich ("1") or lean ("0"). As a result, if rich ("1"), the control proceeds to step 1120 which decreases the non-idling coarse-adjusting term $AF_{c0}$ by $\Delta_0$ (definite), and at step 1802, the minimum value $AF_{c0min}$ is renewed by $AF_{c0}$. On the other hand, if lean ("0"), the control proceeds to step 1121 which increases the non-idling coarse-adjusting term $AF_{c0}$ by $\Delta_0$, and at step 1803, the maximum value $AF_{c0max}$ is renewed by $AF_{c0}$. Then, the control proceeds to step 1122. Note that the minimum value $AF_{c0min}$ and the maximum value $AF_{c0max}$ are used in step 1704 of FIG. 17.

Thus, according to the routines of FIGS. 17 and 18, when the repetition period T of the output $V_{OX}$ of the $O_2$ sensor 14 is small, the calculation of the non-idling coarse-adjusting term $AF_{c0}$ is prohibited, to stabilize the controlled air-fuel ratio.

Note that, although the fine-adjusting term $AF_f$, the $O_2$ storage term $AF_{CCRO}$, and the self-oscillating term $AF_s$ are introduced into the control of the air-fuel ratio in the above-mentioned embodiments, the air-fuel ratio can be controlled only in accordance with the coarse-adjusting term.

Note that the present invention can be applied to a single $O_2$ sensor system where the $O_2$ sensor 14' is located within the catalyst converter 12, as explained above.

Also, a Karman vortex sensor, a heat-wire type flow sensor, and the like can be used instead of the airflow meter.

Although in the above-mentioned embodiments, a fuel injection amount is calculated on the basis of the intake air amount and the engine speed, it can be also calculated on the basis of the intake air pressure and the engine speed, or the throttle opening and the engine speed.

Further, the present invention can be also applied to a carburetor type internal combustion engine in which the air-fuel ratio is controlled by an electric air control value (EACV) for adjusting the intake air amount; by an electric bleed air control valve for adjusting the air bleed amount supplied to a main passage and a slow passage; or by adjusting the secondary air amount introduced into the exhaust system. In this case, the base fuel injection amount corresponding to TAUP at step 1601 of FIG. 16 is determined by the carburetor itself, i.e., the intake air negative pressure and the engine speed, and the air amount corresponding to TAU is calculated at step 1605 of FIG. 16.

Further, a CO sensor, a lean-mixture sensor or the like can be also used instead of the $O_2$ sensor.

As explained above, according to the present invention, the convergence of the controlled air-fuel ratio in an idling state can be improved, since the calculation of the idling coarse-adjusting term is first, carried out at a large integration speed and thereafter, at a small integration speed.

Also, the fluctuation of the controlled air-fuel ratio is suppressed, since the calculation of the idling coarse-adjusting term is prohibited after the controlled air-fuel ratio is close to the stoichiometric air-fuel ratio.

Further, since the idling-coarse adjusting term can be asymmetrically calculated, an overrich air-fuel ratio can be particularly avoided.

Still further, since the calculation of the idling coarse-adjusting term is carried out at a small integration speed if the purge time of the air-fuel ratio sensor is large, the overcorrection of the controlled air-fuel ratio can be avoided, and thus the HC, CO and $NO_x$ emission characteristics can be improved.

What is claimed:

1. A method of controlling an air-fuel ratio in an internal combustion engine having a three-way catalyst converter for removing pollutants in the exhaust gas of said engine, and an air-fuel ratio sensor, disposed downstream of or within said three-way catalyst converter, for detecting a specific component in the exhaust gas, comprising the steps of:
   determining whether said engine is in an idling state or in a non-idling state;
   measuring a duration after the output of said air-fuel ratio sensor is inverted, when said engine is in the idling state;
   changing an idling coarse-adjusting term at a first integration speed in response to the output of said air-fuel ratio sensor, when said duration is smaller than a predetermined time;
   gradually changing said idling coarse-adjusting term at a second integration speed smaller than said first integration speed, in response to the output of said air-fuel ratio sensor, when said duration is not smaller than said predetermined time;
   gradually changing a non-idling coarse-adjusting term at a third integration speed in response to the output of said air-fuel ratio sensor, when said engine is in the non-idling state;
   adjusting an actual air-fuel ratio in accordance with said idling coarse-adjusting term, when said engine is in the idling state; and
   adjusting the actual air-fuel ratio in accordance with said non-idling coarse-adjusting term, when said engine is in the non-idling state.

2. A method as set forth in claim 1, wherein said third integration speed is a value between said first and second integration speeds.

3. A method as set forth in claim 1, further comprising the steps of:
   determining whether or not a repetition period of the output of said air-fuel ratio sensor is smaller than a predetermined period, when said engine is in the idling state; and
   prohibiting the changing of said idling coarse-adjusting term, when the repetition period of the output of said air-fuel ratio sensor is smaller than the predetermined period.

4. A method as set forth in claim 3, further comprising a step of setting a predetermined value in said idling coarse-adjusting term, when the changing of said idling coarse-adjusting term is prohibited.

5. A method as set forth in claim 4, wherein the predetermined value is an intermediate value between maximum and minimum values of said idling coarse-adjusting term immediately before the changing of said idling coarse-adjusting term is prohibited.

6. A method as set forth in claim 1, further comprising the steps of:
   determining whether or not a repetition period of the output of said air-fuel ratio sensor is smaller than a predetermined period, when said engine is in the non-idling state; and
   prohibiting the changing of said non-idling coarse-adjusting term, when the repetition period of the output of said air-fuel ratio sensor is smaller than the predetermined period.

7. A method as set forth in claim 6, further comprising a step of setting a predetermined value in said non-idling coarse-adjusting term, when the changing of said non-idling coarse-adjusting term is prohibited.

8. A method as set forth in claim 7, wherein the predetermined value is an intermediate value between maximum and minimum values of said non-idling coarse-adjusting term immediately before the changing of said non-idling coarse-adjusting term is prohibited.

9. A method as set forth in claim 1, wherein said first integration speed of said idling coarse-adjusting term to the rich side is smaller than said first integration speed of said idling coarse-adjusting term to the lean side.

10. A method as set forth in claim 1, further comprising the steps of:
    detecting a transition in said engine from the non-idling state to the idling state; and
    forcibly changing said idling coarse-adjusting term at said second integration speed in response to the output of said air-fuel ratio sensor for a predetermined period.

11. A method as set forth in claim 10, said predetermined period is defined by a period from said transition to a timing when the output of said air-fuel ratio sensor is inverted.

12. A method as set forth in claim 10, wherein said transition detecting step detects only a transition from a small load state of said engine to the idling state.

13. A method as set forth in claim 12, wherein said transition detecting step comprises a step of determining whether or not an intake air amount per one engine revolution is smaller than a predetermined value, when said engine is in the non-idling state,
    thereby determining that a small load state occurs in said engine when the intake air amount per one engine revolution is smaller than the predetermined value.

14. A method as set forth in claim 12, wherein said transition detecting step comprises the steps of:
    determining whether or not an intake air amount per one engine revolution is smaller than a predetermined value, when said engine is in the non-idling state; and
    calculating a degree of determinations that the intake air amount per one engine revolution is smaller than the predetermined value,
    thereby determining that a small load state occurs in said engine, when the degree of determination is larger than a predetermined value.

15. A method as set forth in claim 1, further comprising a step of generating a self-oscillating term having a predetermined amplitude and a predetermined period,
said air-fuel ratio adjusting step adjusting said actual air-fuel ratio in accordance with said self-oscillating term.

16. A method as set forth in claim 15, wherein said self-oscillating term calculating step comprises the steps of:
decreasing said predetermined amplitude of said self-oscillating term when said engine is in the idling state; and
increasing said predetermined period of said self-oscillating term when said engine is in the idling state.

17. A method of controlling an air-fuel ratio in an internal combustion engine having a three-way catalyst converter for removing pollutants in the exhaust gas of said engine, and an air-fuel ratio sensor, disposed downstream of or within said three-way catalyst converter, for detecting a specific component in the exhaust gas, comprising the steps of:
determining whether said engine is in an idling state or in a non-idling state;
measuring a duration after the output of said air-fuel ratio sensor is inverted, when said engine is in the idling state;
changing an idling coarse-adjusting term at a first integration speed in response to the output of said air-fuel ratio sensor, when said duration is smaller than a predetermined time;
gradually changing said idling coarse-adjusting term at a second integration speed smaller than said first integration speed, in response to the output of said air-fuel ratio sensor, when said duration is not smaller than said predetermined time;
gradually changing a non-idling coarse-adjusting term at a third integration speed in response to the output of said air-fuel ratio sensor, when said engine is in the non-idling state;
calculating a fine-adjusting term having a positive value, when the output of said air-fuel ratio sensor is on the lean side;
calculating a fine adjusting term having a negative value, when the output of said air-fuel ratio sensor is on the rich side;
adjusting an actual air-fuel ratio in accordance with said idling coarse-adjusting term and said fine-adjusting term, when said engine is in the idling state; and
adjusting the actual air-fuel ratio in accordance with said non-idling coarse-adjusting term and said fine-adjusting term, when said engine is in the non-idling state.

18. A method as set forth in claim 17, wherein said third integration speed is a value between said first and second integration speeds.

19. A method as set forth in claim 17, further comprising the steps of:
determining whether or not a repetition period of the output of said air-fuel ratio sensor is smaller than a predetermined period, when said engine is in the idling state; and
prohibiting the changing of said idling coarse-adjusting term, when the repetition period of the output of said air-fuel ratio sensor is smaller than the predetermined period.

20. A method as set forth in claim 19, further comprising a step of setting a predetermined value in said idling coarse-adjusting term, when the changing of said idling coarse-adjusting term is prohibited.

21. A method as set forth in claim 20, wherein the predetermined value is an intermediate value between maximum and minimum values of said idling coarse-adjusting term immediately before the changing of said idling coarse-adjusting term is prohibited.

22. A method as set forth in claim 17, further comprising the steps of:
determining whether or not a repetition period of the output of said air-fuel ratio sensor is smaller than a predetermined period, when said engine is in the non-idling state; and
prohibiting the changing of said non-idling coarse-adjusting term, when the repetition period of the output of said air-fuel ratio sensor is smaller than the predetermined period.

23. A method as set forth in claim 22, further comprising a step of setting a predetermined value in said non-idling coarse-adjusting term, when the changing of said non-idling coarse-adjusting term is prohibited.

24. A method as set forth in claim 23, wherein the predetermined value is an intermediate value between maximum and minimum values of said non-idling coarse-adjusting term immediately before the changing of said non-idling coarse-adjusting term is prohibited.

25. A method as set forth in claim 17, wherein said first integration speed of said idling coarse-adjusting term to the rich side is smaller than said first integration speed of said idling coarse-adjusting term to the lean side.

26. A method as set forth in claim 17, further comprising the steps of:
detecting a transition in said engine from the non-idling state to the idling state; and
forcibly changing said idling coarse-adjusting term at said second integration speed in response to the output of said air-fuel ratio sensor for a predetermined period.

27. A method as set forth in claim 26, said predetermined period is defined by a period from said transition to a timing when the output of said air-fuel ratio sensor is inverted.

28. A method as set forth in claim 26, wherein said transition detecting step detects only a transition from a small load state of said engine to the idling state.

29. A method as set forth in claim 28, wherein said transition detecting step comprises a step of determining whether or not an intake air amount per one engine revolution is smaller than a predetermined value, when said engine is in the non-idling state,
thereby determining that a small load state occurs in said engine when the intake air amount per one engine revolution is smaller than the predetermined value.

30. A method as set forth in claim 28, wherein said transition detecting step comprises the steps of:
determining whether or not an intake air amount per one engine revolution is smaller than a predetermined value, when said engine is in the non-idling state; and
calculating a degree of determinations that the intake air amount per one engine revolution is smaller than the predetermined value;

thereby determining that a small load state occurs in said engine, when the degree of determination is larger than a predetermined value.

31. A method as set forth in claim 17, further comprising a step of generating a self-oscillating term having a predetermined amplitude and a predetermined period,
said air-fuel ratio adjusting step adjusting said actual air-fuel ratio in accordance with said self-oscillating term.

32. A method as set forth in claim 31, wherein said self-oscillating term calculating step comprises the steps of:
decreasing said predetermined amplitude of said self-oscillating term when said engine is in the idling state; and
increasing said predetermined period of said self-oscillating term when said engine is in the idling state.

33. A method of controlling an air-fuel ratio in an internal combustion engine having a three-way catalyst converter for removing pollutants in the exhaust gas of said engine, and an air-fuel ratio sensor, disposed downstream of or within said three-way catalyst converter, for detecting a specific component in the exhaust gas, comprising the steps of:
determining whether said engine is in an idling state or in a non-idling state;
measuring a duration after the output of said air-fuel ratio sensor is inverted, when said engine is in the idling state;
changing an idling coarse-adjusting term at a first integration speed in response to the output of said air-fuel ratio sensor, when said duration is smaller than a predetermined time;
gradually changing said idling coarse-adjusting term at a second integration speed smaller than said first integration speed, in response to the output of said air-fuel ratio sensor, when said duration is not smaller than said predetermined time;
gradually changing a non-idling coarse-adjusting term at a third integration speed in response to the output of said air-fuel ratio sensor, when said engine is in the non-idling state;
calculating an $O_2$ storage term having a negative value, when the output of said air-fuel ratio sensor is higher than a first level corresponding to a rich air-fuel ratio;
calculating an $O_2$ storage term having a positive value, when the output of said air-fuel ratio sensor is lower than a second level corresponding to a lean air-fuel ratio;
adjusting an actual air-fuel ratio in accordance with said idling coarse-adjusting term and said $O_2$ storage term, when said engine is in the idling state; and
adjusting the actual air-fuel ratio in accordance with said non-idling coarse-adjusting term and said $O_2$ storage term, when said engine is in the non-idling state.

34. A method as set forth in claim 33, further comprising the steps of:
gradually decreasing said $O_2$ storage term, when the output of said air-fuel ratio sensor is higher than the first level and said engine is in the non-idling state; and
gradually increasing said $O_2$ storage term, when the output of said air-fuel ratio sensor is lower than the second level and said engine is in the non-idling state.

35. A method as set forth in claim 33, wherein said third integration speed is a value between said first and second integration speeds.

36. A method as set forth in claim 33, further comprising the steps of:
determining whether or not a repetition period of the output of said air-fuel ratio sensor is smaller than a predetermined period, when said engine is in the idling state; and
prohibiting the changing of said idling coarse-adjusting term, when the repetition period of the output of said air-fuel ratio sensor is smaller than the predetermined period.

37. A method as set forth in claim 36, further comprising a step of setting a predetermined value in said idling coarse-adjusting term, when the changing of said idling coarse-adjusting term is prohibited.

38. A method as set forth in claim 37, wherein the predetermined value is an intermediate value between maximum and minimum values of said idling coarse-adjusting term immediately before the changing of said idling coarse-adjusting term is prohibited.

39. A method as set forth in claim 33, further comprising the steps of:
determining whether or not a repetition period of the output of said air-fuel ratio sensor is smaller than a predetermined period, when said engine is in the non-idling state; and
prohibiting the changing of said non-idling coarse-adjusting term, when the repetition period of the output of said air-fuel ratio sensor is smaller than the predetermined period.

40. A method as set forth in claim 39, further comprising a step of setting a predetermined value in said non-idling coarse-adjusting term, when the changing of said non-idling coarse-adjusting term is prohibited.

41. A method as set forth in claim 40, wherein the predetermined value is an intermediate value between maximum and minimum values of said non-idling coarse-adjusting term immediately before the changing of said non-idling coarse-adjusting term is prohibited.

42. A method as set forth in claim 33, wherein said first integration speed of said idling coarse-adjusting term to the rich side is smaller than said first integration speed of said idling coarse-adjusting term to the lean side.

43. A method as set forth in claim 33, further comprising the steps of:
detecting a transition in said engine from the non-idling state to the idling state; and
forcibly changing said idling coarse-adjusting term at said second integration speed in response to the output of said air-fuel ratio sensor for a predetermined period.

44. A method as set forth in claim 43, said predetermined period is defined by a period from said transition to a timing when the output of said air-fuel ratio sensor is inverted.

45. A method as set forth in claim 43, wherein said transition detecting step detects only a transition from a small load state of said engine to the idling state.

46. A method as set forth in claim 45, wherein said transition detecting step comprises a step of determining whether or not an intake air amount per one engine revolution is smaller than a predetermined value, when said engine is in the non-idling state.

thereby determining that a small load state occurs in said engine when the intake air amount per one engine revolution is smaller than the predetermined value.

47. A method as set forth in claim 45, wherein said transition detecting step comprises the steps of:
   determining whether or not an intake air amount per one engine revolution is smaller than a predetermined value, when said engine is in the non-idling state; and
   calculating a degree of determinations that the intake air amount per one engine revolution is smaller than the predetermined value;
   thereby determining that a small load state occurs in said engine, when the degree of determination is larger than a predetermined value.

48. A method as set forth in claim 33, further comprising a step of generating a self-oscillating term having a predetermined amplitude and a predetermined period,
   said air-fuel ratio adjusting step adjusting said actual air-fuel ratio in accordance with said self-oscillating term.

49. A method as set forth in claim 48, wherein said self-oscillating term calculating step comprises the steps of:
   decreasing said predetermined amplitude of said self-oscillating term when said engine is in the idling state; and
   increasing said predetermined period of said self-oscillating term when said engine is in the idling state.

50. A method of controlling an air-fuel ratio in an internal combustion engine having a three-way catalyst converter for removing pollutants in the exhaust gas of said engine, and an air-fuel ratio sensor, disposed downstream of or within said three-way catalyst converter, for detecting a specific component in the exhaust gas, comprising the steps of:
   determining whether said engine is in an idling state or in a non-idling state;
   measuring a duration after the output of said air-fuel ratio sensor is inverted, when said engine is in the idling state;
   changing an idling coarse-adjusting term at a first integration speed in response to the output of said air-fuel ratio sensor, when said duration is smaller than a predetermined time;
   gradually changing said idling coarse-adjusting term at a second integration speed smaller than said first integration speed, in response to the output of said air-fuel ratio sensor, when said duration is not smaller than said predetermined time;
   gradually changing a non-idling coarse-adjusting term at a third integration speed in response to the output of said air-fuel ratio sensor, when said engine is in the non-idling state;
   calculating a fine-adjusting term having a positive value, when the output of said air-fuel ratio sensor is on the lean side;
   calculating a fine adjusting term having a negative value, when the output of said air-fuel ratio sensor is on the rich side;
   calculating an $O_2$ storage term having a negative value, when the output of said air-fuel ratio sensor is higher than a first level corresponding to a rich air-fuel ratio;
   calculating an $O_2$ storage term having a positive value, when the output of said air-fuel ratio sensor is lower than a second level corresponding to a lean air-fuel ratio;
   adjusting an actual air-fuel ratio in accordance with said idling coarse-adjusting term, said fine-adjusting term and said $O_2$ storage term, when said engine is in the idling state; and
   adjusting the actual air-fuel ratio in accordance with said non-idling coarse-adjusting term, said fine-adjusting term and said $O_2$ storage term, when said engine is in the non-idling state.

51. A method as set forth in claim 50, wherein said third integration speed is a value between said first and second integration speeds.

52. A method as set forth in claim 50, further comprising the steps of:
   determining whether or not a repetition period of the output of said air-fuel ratio sensor is smaller than a predetermined period, when said engine is in the idling state; and
   prohibiting the changing of said idling coarse-adjusting term, when the repetition period of the output of said air-fuel ratio sensor is smaller than the predetermined period.

53. A method as set forth in claim 52, further comprising a step of setting a predetermined value in said idling coarse-adjusting term, when the changing of said idling coarse-adjusting term is prohibited.

54. A method as set forth in claim 53, wherein the predetermined value is an intermediate value between maximum and minimum values of said idling coarse-adjusting term immediately before the changing of said idling coarse-adjusting term is prohibited.

55. A method as set forth in claim 50, further comprising the steps of:
   determining whether or not a repetition period of the output of said air-fuel ratio sensor is smaller than a predetermined period, when said engine is in the non-idling state; and
   prohibiting the changing of said non-idling coarse-adjusting term, when the repetition period of the output of said air-fuel ratio sensor is smaller than the predetermined period.

56. A method as set forth in claim 55, further comprising a step of setting a predetermined value in said non-idling coarse-adjusting term, when the changing of said non-idling coarse-adjusting term is prohibited.

57. A method as set forth in claim 56, wherein the predetermined value is an intermediate value between maximum and minimum values of said non-idling coarse-adjusting term immediately before the changing of said non-idling coarse-adjusting term is prohibited.

58. A method as set forth in claim 50, wherein said first integration speed of said idling coarse-adjusting term to the rich side is smaller than said first integration speed of said idling coarse-adjusting term to the lean side.

59. A method as set forth in claim 50, further comprising the steps of:
   detecting a transition in said engine from the non-idling state to the idling state; and
   forcibly changing said idling coarse-adjusting term at said second integration speed in response to the output of said air-fuel ratio sensor for a predetermined period.

60. A method as set forth in claim 59, said predetermined period is defined by a period from said transition to a timing when the output of said air-fuel ratio sensor is inverted.

61. A method as set forth in claim 59, wherein said transition detecting step detects only a transition from a small load state of said engine to the idling state.

62. A method as set forth in claim 61, wherein said transition detecting step comprises a step of determining whether or not an intake air amount per one engine revolution is smaller than a predetermined value, when said engine is in the non-idling state,
thereby determining that a small load state occurs in said engine when the intake air amount per one engine revolution is smaller than the predetermined value.

63. A method as set forth in claim 61, wherein said transition detecting step comprises the steps of:
determining whether or not an intake air amount per one engine revolution is smaller than a predetermined value, when said engine is in the non-idling state; and
calculating a degree of determination that the intake air amount per one engine revolution is smaller than the predetermined value;
thereby determining that a small load state occurs in said engine, when the degree of determination is larger than a predetermined value.

64. A method as set forth in claim 50, further comprising a step of generating a self-oscillating term having a predetermined amplitude and a predetermined period,
said air-fuel ratio adjusting step adjusting said actual air-fuel ratio in accordance with said self-oscillating term.

65. A method as set forth in claim 64, wherein said self-oscillating term calculating step comprises the steps of:
decreasing said predetermined amplitude of said self-oscillating term when said engine is in the idling state; and
increasing said predetermined period of said self-oscillating term when said engine is in the idling state.

66. A method as set forth in claim 50, further comprising the steps of:
gradually decreasing said $O_2$ storage term, when the output of said air-fuel ratio sensor is higher than the first level and said engine is in the non-idling state; and
gradually increasing said $O_2$ storage term, when the output of said air-fuel ratio sensor is lower than the second level and said engine is in the non-idling state.

67. An apparatus for controlling an air-fuel ratio in an internal combustion engine having a three-way catalyst converter for removing pollutants in the exhaust gas of said engine, and an air-fuel ratio sensor, disposed downstream of or within said three-way catalyst converter, for detecting a specific component in the exhaust gas, comprising:
means for determining whether said engine is in an idling state or in a non-idling state;
means for measuring a duration after the output of said air-fuel ratio sensor is inverted, when said engine is in the idling state;
means for changing an idling coarse-adjusting term at a first integration speed in response to the output of said air-fuel ratio sensor, when said duration is smaller than a predetermined time;
means for gradually changing said idling coarse-adjusting term at a second integration speed smaller than said first integration speed, in response to the output of said air-fuel ratio sensor, when said duration is not smaller than said predetermined time;
means for gradually changing a non-idling coarse-adjusting term at a third integration speed in response to the output of said air-fuel ratio sensor, when said engine is in the non-idling state;
means for adjusting an actual air-fuel ratio in accordance with said idling coarse-adjusting term, when said engine is in the idling state; and
means for adjusting the actual air-fuel ratio in accordance with said non-idling coarse-adjusting term, when said engine is in the non-idling state.

68. An apparatus as set forth in claim 67, wherein said third integration speed is a value between said first and second integration speeds.

69. An apparatus as set forth in claim 67, further comprising:
means for determining whether or not a repetition period of the output of said air-fuel ratio sensor is smaller than a predetermined period, when said engine is in the idling state; and
means for prohibiting the changing of said idling coarse-adjusting term, when the repetition period of the output of said air-fuel ratio sensor is smaller than the predetermined period.

70. An apparatus as set forth in claim 69, further comprising means for setting a predetermined value in said idling coarse-adjusting term, when the changing of said idling coarse-adjusting term is prohibited.

71. An apparatus as set forth in claim 70, wherein the predetermined value is an intermediate value between maximum and minimum values of said idling coarse-adjusting term immediately before the changing of said idling coarse-adjusting term is prohibited.

72. An apparatus as set forth in claim 67, further comprising:
means for determining whether or not a repetition period of the output of said air-fuel ratio sensor is smaller than a predetermined period, when said engine is in the non-idling state; and
means for prohibiting the changing of said non-idling coarse-adjusting term, when the repetition period of the output of said air-fuel ratio sensor is smaller than the predetermined period.

73. An apparatus as set forth in claim 72, further comprising means for setting a predetermined value in said non-idling coarse-adjusting term, when the changing of said non-idling coarse-adjusting term is prohibited.

74. An apparatus as set forth in claim 73, wherein the predetermined value is an intermediate value between maximum and minimum values of said non-idling coarse-adjusting term immediately before the changing of said non-idling coarse-adjusting term is prohibited.

75. An apparatus as set forth in claim 67, wherein said first integration speed of said idling coarse-adjusting term to the rich side is smaller than said first integration speed of said idling coarse-adjusting term to the lean side.

76. An apparatus as set forth in claim 67, further comprising:
means for detecting a transition in said engine from the non-idling state to the idling state; and means for forcibly changing said idling coarse-adjusting term at said second integration speed in response to the output of said air-fuel ratio sensor for a predetermined period.

77. An apparatus as set forth in claim 76, said predetermined period is defined by a period from said transition to a timing when the output of said air-fuel ratio sensor is inverted.

78. An apparatus as set forth in claim 76, wherein said transition detecting means detects only a transition from a small load state of said engine to the idling state.

79. An apparatus as set forth in claim 78, wherein said transition detecting means comprises means for determining whether or not an intake air amount per one engine revolution is smaller than a predetermined value, when said engine is in the non-idling state,
thereby determining that a small load state occurs in said engine when the intake air amount per one engine revolution is smaller than the predetermined value.

80. An apparatus as set forth in claim 78, wherein said transition detecting means comprises:
means for determining whether or not an intake air amount per one engine revolution is smaller than a predetermined value, when said engine is in the non-idling state; and
means for calculating a degree of determinations that the intake air amount per one engine revolution is smaller than the predetermined value,
thereby determining that a small load state occurs in said engine, when the degree of determination is larger than a predetermined value.

81. An apparatus as set forth in claim 67, further comprising means for generating a self-oscillating term having a predetermined amplitude and a predetermined period,
said air-fuel ratio adjusting means adjusting said actual air-fuel ratio in accordance with said self-oscillating term.

82. An apparatus as set forth in claim 81, wherein said self-oscillating term calculating means comprises:
means for decreasing said predetermined amplitude of said self-oscillating term when said engine is in the idling state; and
means for increasing said predetermined period of said self-oscillating term when said engine is in the idling state.

83. An apparatus for controlling an air-fuel ratio in an internal combustion engine having a three-way catalyst converter for removing pollutants in the exhaust gas of said engine, and an air-fuel ratio sensor, disposed downstream of or within said three-way catalyst converter, for detecting a specific component in the exhaust gas, comprising:
means for determining whether said engine is in an idling state or in a non-idling state;
means for measuring a duration after the output of said air-fuel ratio sensor is inverted, when said engine is in the idling state;
means for changing an idling coarse-adjusting term at a first integration speed in response to the output of said air-fuel ratio sensor, when said duration is smaller than a predetermined time;
means for gradually changing said idling coarse-adjusting term at a second integration speed smaller than said first integration speed, in response to the output of said air-fuel ratio sensor, when said duration is not smaller than said predetermined time;
means for gradually changing a non-idling coarse-adjusting term at a third integration speed in response to the output of said air-fuel ratio sensor, when said engine is in the non-idling state;
means for calculating a fine-adjusting term having a positive value, when the output of said air-fuel ratio sensor is on the lean side;
means for calculating a fine adjusting term having a negative value, when the output of said air-fuel ratio sensor is on the rich side;
means for adjusting an actual air-fuel ratio in accordance with said idling coarse-adjusting term and said fine-adjusting term, when said engine is in the idling state; and
means for adjusting the actual air-fuel ratio in accordance with said non-idling coarse-adjusting term and said fine-adjusting term, when said engine is in the non-idling state.

84. An apparatus as set forth in claim 83, wherein said third integration speed is a value between said first and second integration speeds.

85. An apparatus as set forth in claim 84, further comprising:
means for determining whether or not a repetition period of the output of said air-fuel ratio sensor is smaller than a predetermined period, when said engine is in the idling state; and
means for prohibiting the changing of said idling coarse-adjusting term, when the repetition period of the output of said air-fuel ratio sensor is smaller than the predetermined period.

86. An apparatus as set forth in claim 85, further comprising means for setting a predetermined value in said idling coarse-adjusting term, when the changing of said idling coarse-adjusting term is prohibited.

87. An apparatus as set forth in claim 86, wherein the predetermined value is an intermediate value between maximum and minimum values of said idling coarse-adjusting term immediately before the changing of said idling coarse-adjusting term is prohibited.

88. An apparatus as set forth in claim 83, further comprising:
means for determining whether or not a repetition period of the output of said air-fuel ratio sensor is smaller than a predetermined period, when said engine is in the non-idling state; and
means for prohibiting the changing of said non-idling coarse-adjusting term, when the repetition period of the output of said air-fuel ratio sensor is smaller than the predetermined period.

89. An apparatus as set forth in claim 88, further comprising means for setting a predetermined value in said non-idling coarse-adjusting term, when the changing of said non-idling coarse-adjusting term is prohibited.

90. An apparatus as set forth in claim 89, wherein the predetermined value is an intermediate value between maximum and minimum values of said non-idling coarse-adjusting term immediately before the changing of said non-idling coarse-adjusting term is prohibited.

91. An apparatus as set forth in claim 83, wherein said first integration speed of said idling coarse-adjusting term to the rich side is smaller than said first integration speed of said idling coarse-adjusting term to the lean side.

92. An apparatus as set forth in claim 83, further comprising:
   means for detecting a transition in said engine from the non-idling state to the idling state; and
   means for forcibly changing said idling coarse-adjusting term at said second integration speed in response to the output of said air-fuel ratio sensor for a predetermined period.

93. An apparatus as set forth in claim 92, said predetermined period is defined by a period from said transition to a timing when the output of said air-fuel ratio sensor is inverted.

94. An apparatus as set forth in claim 92, wherein said transition detecting step detects only a transition from a small load state of said engine to the idling state.

95. An apparatus as set forth in claim 94, wherein said transition detecting means comprises means for determining whether or not an intake air amount per one engine revolution is smaller than a predetermined value, when said engine is in the non-idling state,
   thereby determining that a small load state occurs in said engine when the intake air amount per one engine revolution is smaller than the predetermined value.

96. An apparatus as set forth in claim 94, wherein said transition detecting means comprises:
   means for determining whether or not an intake air amount per one engine revolution is smaller than a predetermined value, when said engine is in the non-idling state; and
   means for calculating a degree of determinations that the intake air amount per one engine revolution is smaller than the predetermined value;
   thereby determining that a small load state occurs in said engine, when the degree of determination is larger than a predetermined value.

97. An apparatus as set forth in claim 83, further comprising means for generating a self-oscillating term having a predetermined amplitude and a predetermined period,
   said air-fuel ratio adjusting means adjusting said actual air-fuel ratio in accordance with said self-oscillating term.

98. An apparatus as set forth in claim 97, wherein said self-oscillating term calculating means comprises:
   means for decreasing said predetermined amplitude of said self-oscillating term when said engine is in the idling state; and
   means for increasing said predetermined period of said self-oscillating term when said engine is in the idling state.

99. An apparatus for controlling an air-fuel ratio in an internal combustion engine having a three-way catalyst converter for removing pollutants in the exhaust gas of said engine, and an air-fuel ratio sensor, disposed downstream of or within said three-way catalyst converter, for detecting a specific component in the exhaust gas, comprising:
   means for determining whether said engine is in an idling state or in a non-idling state;
   means for measuring a duration after the output of said air-fuel ratio sensor is inverted, when said engine is in the idling state;
   means for changing an idling coarse-adjusting term at a first integration speed in response to the output of said air-fuel ratio sensor, when said duration is smaller than a predetermined time;
   means for gradually changing said idling coarse-adjusting term at a second integration speed smaller than said first integration speed, in response to the output of said air-fuel ratio sensor, when said duration is not smaller than said predetermined time;
   means for gradually changing a non-idling coarse-adjusting term at a third integration speed in response to the output of said air-fuel ratio sensor, when said engine is in the non-idling state;
   means for calculating an $O_2$ storage term having a negative value, when the output of said air-fuel ratio sensor is higher than a first level corresponding to a rich air-fuel ratio;
   means for calculating an $O_2$ storage term having a positive value, when the output of said air-fuel ratio sensor is lower than a second level corresponding to a lean air-fuel ratio;
   means for adjusting an actual air-fuel ratio in accordance with said idling coarse-adjusting term and said $O_2$ storage term, when said engine is in the idling state; and
   means for adjusting the actual air-fuel ratio in accordance with said non-idling coarse-adjusting term and said $O_2$ storage term, when said engine is in the non-idling state.

100. An apparatus as set forth in claim 99, further comprising:
   means for gradually decreasing said $O_2$ storage term, when the output of said air-fuel ratio sensor is higher than the first level and said engine is in the non-idling state; and
   means for gradually increasing said $O_2$ storage term, when the output of said air-fuel ratio sensor is lower than the second level and said engine is in the non-idling state.

101. An apparatus as set forth in claim 99, wherein said third integration speed is a value between said first and second integration speeds.

102. An apparatus as set forth in claim 99, further comprising:
   means for determining whether or not a repetition period of the output of said air-fuel ratio sensor is smaller than a predetermined period, when said engine is in the idling state; and
   means for prohibiting the changing of said idling coarse-adjusting term, when the repetition period of the output of said air-fuel ratio sensor is smaller than the predetermined period.

103. An apparatus as set forth in claim 102, further comprising means for setting a predetermined value in said idling coarse-adjusting term, when the changing of said idling coarse-adjusting term is prohibited.

104. An apparatus as set forth in claim 103, wherein the predetermined value is an intermediate value between maximum and minimum values of said idling coarse-adjusting term immediately before the changing of said idling coarse-adjusting term is prohibited.

105. An apparatus as set forth in claim 99, further comprising:
   means for determining whether or not a repetition period of the output of said air-fuel ratio sensor is smaller than a predetermined period, when said engine is in the non-idling state; and
   means for prohibiting the changing of said non-idling coarse-adjusting term, when the repetition period of the output of said air-fuel ratio sensor is smaller than the predetermined period.

106. An apparatus as set forth in claim 105, further comprising means for setting a predetermined value in said non-idling coarse-adjusting term, when the changing of said non-idling coarse-adjusting term is prohibited.

107. An apparatus as set forth in claim 106, wherein the predetermined value is an intermediate value between maximum and minimum values of said non-idling coarse-adjusting term immediately before the changing of said non-idling coarse-adjusting term is prohibited.

108. An apparatus as set forth in claim 99, wherein said first integration speed of said idling coarse-adjusting term to the rich side is smaller than said first integration speed of said idling coarse-adjusting term to the lean side.

109. An apparatus as set forth in claim 99, further comprising:
means for detecting a transition in said engine from the non-idling state to the idling state; and
means for forcibly changing said idling coarse-adjusting term at said second integration speed in response to the output of said air-fuel ratio sensor for a predetermined period.

110. An apparatus as set forth in claim 109, said predetermined period is defined by a period from said transition to a timing when the output of said air-fuel ratio sensor is inverted.

111. An apparatus as set forth in claim 109, wherein said transition detecting means detects only a transition from a small load state of said engine to the idling state.

112. An apparatus as set forth in claim 111, wherein said transition detecting means comprises means for determining whether or not an intake air amount per one engine revolution is smaller than a predetermined value, when said engine is in the non-idling state,
thereby determining that a small load state occurs in said engine when the intake air amount per one engine revolution is smaller than the predetermined value.

113. An apparatus as set forth in claim 111, wherein said transition detecting means comprises:
means for determining whether or not an intake air amount per one engine revolution is smaller than a predetermined value, when said engine is in the non-idling state; and
means for calculating a degree of determinations that the intake air amount per one engine revolution is smaller than the predetermined value;
thereby determining that a small load state occurs in said engine, when the degree of determination is larger than a predetermined value.

114. An apparatus as set forth in claim 99, further comprising means for generating a self-oscillating term having a predetermined amplitude and a predetermined period,
said air-fuel ratio adjusting means adjusting said actual air-fuel ratio in accordance with said self-oscillating term.

115. An apparatus as set forth in claim 114, wherein said self-oscillating term calculating means comprises:
means for decreasing said predetermined amplitude of said self-oscillating term when said engine is in the idling state; and
means for increasing said predetermined period of said self-oscillating term when said engine is in the idling state.

116. An apparatus for controlling an air-fuel ratio in an internal combustion engine having a three-way catalyst converter for removing pollutants in the exhaust gas of said engine, and an air-fuel ratio sensor, disposed downstream of or within said three-way catalyst converter, for detecting a specific component in the exhaust gas, comprising:
means for determining whether said engine is in an idling state or in a non-idling state;
means for measuring a duration after the output of said air-fuel ratio sensor is inverted, when said engine is in the idling state;
means for changing an idling coarse-adjusting term at a first integration speed in response to the output of said air-fuel ratio sensor, when said duration is smaller than a predetermined time;
means for gradually changing said idling coarse-adjusting term at a second integration speed smaller than said first integration speed, in response to the output of said air-fuel ratio sensor, when said duration is not smaller than said predetermined time;
means for gradually changing a non-idling coarse-adjusting term at a third integration speed in response to the output of said air-fuel ratio sensor, when said engine is in the non-idling state;
means for calculating a fine-adjusting term having a positive value, when the output of said air-fuel ratio sensor is on the lean side;
means for calculating a fine adjusting term having a negative value, when the output of said air-fuel ratio sensor is on the rich side;
means for calculating an $O_2$ storage term having a negative value, when the output of said air-fuel ratio sensor is higher than a first level corresponding to a rich air-fuel ratio;
means for calculating an $O_2$ storage term having a positive value, when the output of said air-fuel ratio sensor is lower than a second level corresponding to a lean air-fuel ratio;
means for adjusting an actual air-fuel ratio in accordance with said idling coarse-adjusting term, said fine-adjusting term and said $O_2$ storage term, when said engine is in the idling state; and
means for adjusting the actual air-fuel ratio in accordance with said non-idling coarse-adjusting term, said fine-adjusting term and said $O_2$ storage term, when said engine is in the non-idling state.

117. An apparatus as set forth in claim 116, wherein said third integration speed is a value between said first and second integration speeds.

118. An apparatus as set forth in claim 116, further comprising:
means for determining whether or not a repetition period of the output of said air-fuel ratio sensor is smaller than a predetermined period, when said engine is in the idling state; and
means for prohibiting the changing of said idling coarse-adjusting term, when the repetition period of the output of said air-fuel ratio sensor is smaller than the predetermined period.

119. An apparatus as set forth in claim 118, further comprising means for setting a predetermined value in said idling coarse-adjusting term, when the changing of said idling coarse-adjusting term is prohibited.

120. An apparatus as set forth in claim 119, wherein the predetermined value is an intermediate value between maximum and minimum values of said idling coarse-adjusting term immediately before the changing of said idling coarse-adjusting term is prohibited.

121. An apparatus as set forth in claim 116, further comprising:
  means for determining whether or not a repetition period of the output of said air-fuel ratio sensor is smaller than a predetermined period, when said engine is in the non-idling state; and
  means for prohibiting the changing of said non-idling coarse-adjusting term, when the repetition period of the output of said air-fuel ratio sensor is smaller than the predetermined period.

122. An apparatus as set forth in claim 121, further comprising means for setting a predetermined value in said non-idling coarse-adjusting term, when the changing of said non-idling coarse-adjusting term is prohibited.

123. An apparatus as set forth in claim 112, wherein the predetermined value is an intermediate value between maximum and minimum values of said non-idling coarse-adjusting term immediately before the changing of said non-idling coarse-adjusting term is prohibited.

124. An apparatus as set forth in claim 116, wherein said first integration speed of said idling coarse-adjusting term to the rich side is smaller than said first integration speed of said idling coarse-adjusting term to the lean side.

125. An apparatus as set forth in claim 111, further comprising:
  means for detecting a transition in said engine from the non-idling state to the idling state; and
  means for forcibly changing said idling coarse-adjusting term at said second integration speed in response to the output of said air-fuel ratio sensor for a predetermined period.

126. An apparatus as set forth in claim 125, said predetermined period is defined by a period from said transition to a timing when the output of said air-fuel ratio sensor is inverted.

127. An apparatus as set forth in claim 125, wherein said transition detecting means detects only a transition from a small load state of said engine to the idling state.

128. An apparatus as set forth in claim 127, wherein said transition detecting means comprises means for determining whether or not an intake air amount per one engine revolution is smaller than a predetermined value, when said engine is in the non-idling state,
  thereby determining that a small load state occurs in said engine when the intake air amount per one engine revolution is smaller than the predetermined value.

129. An apparatus as set forth in claim 127, wherein said transition detecting means comprises:
  means for determining whether or not an intake air amount per one engine revolution is smaller than a predetermined value, when said engine is in the non-idling state; and
  means for calculating a degree of determination that the intake air amount per one engine revolution is smaller than the predetermined value;
  thereby determining that a small load state occurs in said engine, when the degree of determination is larger than a predetermined value.

130. An apparatus as set forth in claim 116, further comprising means for generating a self-oscillating term having a predetermined amplitude and a predetermined period,
  said air-fuel ratio adjusting means adjusting said actual air-fuel ratio in accordance with said self-oscillating term.

131. An apparatus as set forth in claim 130, wherein said self-oscillating term calculating means comprises:
  means for decreasing said predetermined amplitude of said self-oscillating term when said engine is in the idling state; and
  means for increasing said predetermined period of said self-oscillating term when said engine is in the idling state.

132. An apparatus as set forth in claim 116, further comprising:
  means for gradually decreasing said $O_2$ storage term, when the output of said air-fuel ratio sensor is higher than the first level and said engine is in the non-idling state; and
  means for gradually increasing said $O_2$ storage term, when the output of said air-fuel ratio sensor is lower than the second level and said engine is in the non-idling state.

* * * * *

UNITED STATES PATENT AND TRADEMARK OFFICE
CERTIFICATE OF CORRECTION

PATENT NO. : 5,070,693

DATED : December 10, 1991

INVENTOR(S) : M. Nada

It is certified that error appears in the above-identified patent and that said Letters Patent is hereby corrected as shown below:

```
Column 1, line 15, change "As" to --In--.
          line 18, after "sensors" insert --, one--.
          line 19, after "and" to --one--.
          line 66, change "obtained" to
          --obtained.--.
          line 67, after "sensor" insert -- system,
          however, two O. sensors are required,
          thus--.

Column 3, line 8, delete "13A,".

Column 4, line 8, change "XX." to --X,X.--.
          line 58, after "by" insert --AFcs--.

Column 6, line 9, change "14," to --14´,--.
          line 19, change "10." to --102--.
```

UNITED STATES PATENT AND TRADEMARK OFFICE
CERTIFICATE OF CORRECTION

PATENT NO. : 5,070,693

DATED : December 10, 1991

INVENTOR(S) : M. Nada

It is certified that error appears in the above-identified patent and that said Letters Patent is hereby corrected as shown below:

Column 7, line 40, change "volta" to --voltage--.

Column 8, line 45, change "t1." to --+1.--.
          line 53, change "t1." to --+1.--.

Column 9, line 24, change "$\leq$" to --$\geq$--.

Column 10, line 13, change "$\leq$" to --$\geq$--.
          line 16, change "nonidling" to --non-idling--.
          line 26, change "$\geq$" to --$\leq$--.

Column 11, line 10, chnge "$XT_l$" to --XT1--.

Column 13, line 38, change "AFccor" to --AFccro--.

Column 14, line 9, after "amount" insert --AFccro--.

Column 15, line 28, after "the" insert --the calculation of--, same line, change "prohibited" to --prohibited,--.

Signed and Sealed this

Twentieth Day of September, 1994

Attest:

BRUCE LEHMAN

*Attesting Officer*     *Commissioner of Patents and Trademarks*